United States Patent
Takahashi

(10) Patent No.: US 9,940,473 B2
(45) Date of Patent: Apr. 10, 2018

(54) INFORMATION PROCESSING DEVICE, INFORMATION PROCESSING METHOD AND MEDIUM

(71) Applicant: NEC CORPORATION, Tokyo (JP)

(72) Inventor: Tsubasa Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 14/758,590

(22) PCT Filed: Jan. 6, 2014

(86) PCT No.: PCT/JP2014/000002
§ 371 (c)(1),
(2) Date: Jun. 30, 2015

(87) PCT Pub. No.: WO2014/109277
PCT Pub. Date: Jul. 17, 2014

(65) Prior Publication Data
US 2015/0339488 A1 Nov. 26, 2015

(30) Foreign Application Priority Data
Jan. 10, 2013 (JP) .................................. 2013-002715

(51) Int. Cl.
*G06F 21/62* (2013.01)
*G06F 17/30* (2006.01)

(52) U.S. Cl.
CPC .... *G06F 21/6218* (2013.01); *G06F 17/30598* (2013.01); *G06F 21/6254* (2013.01)

(58) Field of Classification Search
CPC ............... G06F 21/60; G06F 17/30598; G06F 21/6254; G06F 21/6218
See application file for complete search history.

(56) References Cited

U.S. PATENT DOCUMENTS

| | | | | |
|---|---|---|---|---|
| 2011/0178943 A1* | 7/2011 | Motahari | ............ | G06F 21/6254 705/325 |
| 2014/0172854 A1* | 6/2014 | Huang | ................ | G06F 21/6245 707/737 |

FOREIGN PATENT DOCUMENTS

| | | |
|---|---|---|
| JP | 2011-180839 A | 9/2011 |
| JP | 2012-3440 A | 1/2012 |
| JP | 2012-22315 A | 2/2012 |

OTHER PUBLICATIONS

Latanya Sweeney, "k-Anonymity: a Model for Protecting Privacy", International Journal on Uncertainty, Fuzziness and Knowledge-Based Systems, Oct. 2002, pp. 555-570, vol. 10, Issue 05.
(Continued)

*Primary Examiner* — Brandon Hoffman
*Assistant Examiner* — Nega Woldemariam
(74) *Attorney, Agent, or Firm* — Sughrue Mion, PLLC

(57) ABSTRACT

An information processing device of the present invention includes: a cluster information acquisition unit which acquires information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and a set-valued attribute refinement unit which discloses at least a portion of attribute values from among removed attribute values of the set-valued attributes of records included in the cluster acquired by the cluster acquisition, and divides the cluster into clusters which satisfy the predetermined anonymity based on the disclosed attribute values.

6 Claims, 14 Drawing Sheets

(56) References Cited

OTHER PUBLICATIONS

Kristen Lefevre, et al., "Mondrian Multidimensional k-Anonymity", Data Engineering, 2006. ICDE '06. Proceedings of the 22nd International Conference on Data Engineering, Apr. 2006, 11 pages.
Yeye He, et al., "Anonymization of Set-Valued Data via Top-Down, Local Generalization", International Conference on Very Large Databases, Aug. 2009, pp. 934-945, vol. 2, Issue 1.
Manolis Terrovitis, et al., "Privacy Preserving Anonymization of Set-valued Data", Proceedings of the VLDB, Aug. 2008, pp. 115-125, vol. 1, Issue 1.
Yabo Xu, et al., "Anonymizing Transaction Databases for Publication", Proceedings of the 14th ACM SIGKDD International Conference on Knowledge Discovery and Data Mining, 2008, pp. 767-775.
Junqiang Liu, et al., "Anonymizing Transaction Data by Integrating Suppression and Generalization", Advances in Knowledge Discovery and Data Mining Lecture Notes in Computer Science, 2010, pp. 171-180, vol. 6118.
Rui Chen, et al., "Publishing Set-Valued Data via Differential Privacy," Proceedings of the VLDB Endowment, Aug. 2011, pp. 1087-1098, vol. 4, No. 11.
International Search Report for PCT/JP2014/000002 dated Mar. 4, 2014 [PCT/ISA/210].

* cited by examiner

Fig.6

| PATIENT ID | YEAR OF BIRTH | GENDER | DISEASE NAME | DRUG NAME |
|---|---|---|---|---|
| | SINGLE-VALUED ATTRIBUTE | | SET-VALUED ATTRIBUTE | |
| 1 | 1970 | MALE | A, B, C | a, b, d |
| 2 | 1971 | MALE | A, B, C | a, f, g |
| 3 | 1974 | FEMALE | D, E | a, d, e, y, z |
| 4 | 1980 | MALE | D, E | a, b, c, f, g |
| 5 | 1960 | FEMALE | A, D | b, c, f |
| 6 | 1999 | FEMALE | E, F | c, e, x |
| 7 | 1982 | MALE | E, F | b, e, x |
| 8 | 2001 | FEMALE | A, D | b, c |
| 9 | 1984 | MALE | E, F | e, f, x |

Fig.7

| DRUG NAME | INITIAL STATE | ITERATION 1 | ITERATION 2 | ITERATION 3 | ITERATION 4 |
|---|---|---|---|---|---|
| a, b, d | * | a, * | a, d, * | a, d, * | a, d, * |
| a, f, g | * | a, * | a, * | a, f, * | a, f, g, * |
| a, d, e, y, z | * | a, * | a, d, * | a, d, * | a, d, * |
| a, b, c, f, g | * | a, * | a, * | a, f, * | a, f, g, * |
| b, c, f | * | * | * | b, * | b, c, * |
| c, e, x | * | * | e, * | e, x, * | e, x, * |
| b, e, x | * | * | e, * | e, x, * | e, x, * |
| b, c | * | * | * | b, * | b, c, * |
| e, f, x | * | * | e, * | e, x, * | e, x, * |

Fig.10

| CLUSTER IDENTIFIER | ATTRIBUTE NAME | COMMON ATTRIBUTE VALUE |
|---|---|---|
| 1 | YEAR OF BIRTH | 1970-1979 |
| 1 | GENDER | ANY |
| 1 | DRUG NAME | BIOFERMIN |
| 1 | DRUG NAME | TAMIFLU |
| 1 | DISEASE NAME | INFLUENZA |
| 2 | YEAR OF BIRTH | 1970-1979 |
| 2 | GENDER | ANY |
| 2 | DRUG NAME | TAMIFLU |
| 2 | DISEASE NAME | INFLUENZA |

Fig.11

| DRUG NAME | INITIAL STATE | NCP$_{sv}$ VALUE | | | |
|---|---|---|---|---|---|
| | | ITERATION 1 | ITERATION 2 | ITERATION 3 | ITERATION 4 |
| a, b, d | 1 | 2/3 | 1/3 | 1/3 | 1/3 |
| a, f, g | 1 | 2/3 | 2/3 | 1/3 | 0 |
| a, d, e, y, z | 1 | 4/5 | 3/5 | 3/5 | 3/5 |
| a, b, c, f, g | 1 | 4/5 | 4/5 | 3/5 | 2/5 |
| b, c, f | 1 | 1 | 1 | 2/3 | 1/3 |
| c, e, x | 1 | 1 | 2/3 | 1/3 | 1/3 |
| b, e, x | 1 | 1 | 2/3 | 1/3 | 1/3 |
| b, c | 1 | 1 | 1 | 1/2 | 0 |
| e, f, x | 1 | 1 | 2/3 | 1/3 | 1/3 |

INFORMATION PROCESSING DEVICE, INFORMATION PROCESSING METHOD AND MEDIUM

CROSS REFERENCE TO RELATED APPLICATIONS

This application is a National Stage of International Application No. PCT/JP2014/000002, filed on Jan. 6, 2014, which claims priority from Japanese Patent Application No. 2013-002715, filed on Jan. 10, 2013, the contents of all of which are incorporated herein by reference in their entirety.

TECHNICAL FIELD

The present invention relates to an information processing device that handles privacy information.

BACKGROUND ART

Recent years, in various services, privacy information related to individuals has been stored in information processing devices. Such privacy information includes, for example, purchase information or medical treatment information of individuals. For example, a medical prescription receipt ([German: Rezept]), which is a medical care fee claims' bill, is a data set composed of records with attributes on a patient and treatment (for example, year of birth, gender, disease name, and drug name) and stored in an information processing device.

From the viewpoint of privacy protection, it is not desirable that such privacy information is disclosed or used while remaining unchanged from original information contents.

Attributes which characterize an individual and have a possibility of specifying an individual from a combination thereof, such as year of birth and gender, are referred to as "quasi-identifier". Attributes which an individual do not want others to know, such as disease name and drug name, are referred to as "sensitive attribute (sensitive information: Sensitive Attribute (SA), or Sensitive Value (SV))".

An attribute including a single value, such as year of birth or gender, is referred to as "single-valued attribute".

An attribute, which may include a single value or a plurality of values (set value) such as disease name or drug name, is referred to as "set-valued attribute".

A data set including privacy information is information, the secondary use of which is significantly beneficial, unless there is concern for privacy invasion. The secondary use means that privacy information is provided to a third party other than a service provider who generates and stores the privacy information, and the third party who is provided with the information uses the information. Alternatively, the secondary use means that a service provider provides a third party with privacy information and outsources work, such as analysis, to the third party.

Secondary use of privacy information promotes analysis and research of the privacy information and makes it possible to enhance service by using an analysis result and a research result. Furthermore, secondary use of privacy information makes it possible for a third party to enjoy a significant benefit which the privacy information has.

For example, a pharmaceutical company may be supposed to be a third party. A pharmaceutical company is able to analyze a co-occurrence relation or a correlation of pharmaceuticals based on treatment information. However, it is difficult for a pharmaceutical company to obtain treatment information. If a pharmaceutical company obtains treatment information, the pharmaceutical company is able to know how pharmaceuticals are used and further analyze effectiveness of the pharmaceuticals.

However, active secondary use of a data set including privacy information has not been carried out due to concern for privacy invasion.

For example, it is assumed that a data set composed of records each including a user identifier (user ID (identifier)) which identifies a service user uniquely and one or more pieces of sensitive information is stored in an information processing device of a service provider. If the user identifier and the sensitive information are provided to a third party, the third party, by using the user identifier, is able to specify the service user who is related to the sensitive information. Therefore, a problem of privacy invasion may be occur.

A case in which, in a data set composed of a plurality of records, one or more quasi-identifiers are given to each record is supposed. In this case, there is a possibility that an individual who is related to the data can be specified based on a combination of the quasi-identifiers. In other words, when an individual can be specified based on a combination of quasi-identifiers even for a data set from which user identifiers are removed, privacy invasion may be occur.

As a technology to convert a data set including privacy information to a form in which privacy is protected while maintaining usefulness, anonymization is known.

In relation to the anonymization, "k-anonymity", which is one of the most well-known anonymity indices, has been proposed (for example, refer to NPL 1). A technology satisfying k-anonymity according to an anonymized target data set is referred to as "k-anonymization". The k-anonymization converts target quasi-identifiers so that at least k or more records having the same quasi-identifiers exist in the anonymization target data set. As a conversion process, for example, "generalization" or "suppression" is known. The generalization is a process to convert original information to abstracted information. The suppression is a process to remove original information.

As a related technology, which uses the k-anonymization technique, a technology to encrypt and store data received from a user terminal, converts decrypted data so as to satisfy k-anonymity, and transmits the converted data to a server of a service provider, has been proposed (for example, refer to PLT 1).

As another technology using the k-anonymization technique, a method, which uses a set of records (hereinafter, referred to as "cluster") including similar attribute values, has been proposed (for example, refer to PLT 2 and NPL 2). This method generates clusters including similar attribute values successively, and, in records included in the clusters, generates common attribute values by using generalization or suppression.

The related technologies disclosed in the above-described PLT 1, PLT 2, and NPL 2 perform k-anonymization to single-valued attributes.

However, there is a case in which, in a data set composed of a plurality of records, an individual can be specified based on a combination of sensitive information given to respective records. That is, there is a case in which an individual can be specified based on a combination of sensitive information even in a data set in which a user identifier is removed and quasi-identifiers are anonymized. Thus, privacy invasion can also occur based on a combination of sensitive information. As described above, a sensitive attribute may become a cause of individual specification as with a quasi-identifier. Therefore, it is also necessary to handle a sensitive attribute in a similar manner to a quasi-identifier.

However, if all sensitive information is removed from a data set, information loss can be caused. As a result, benefit of a data set including privacy information is lost. For example, when a data set of treatment information from which all sensitive information is removed is used, it is difficult to carry out an analysis of correlation and co-occurrence between a disease and another disease.

Thus, an anonymization technology for a set-valued attribute indicating such sensitive information has been proposed (for example, refer to NPLs 3 to 6).

For example, a related technology described in NPL 3 carries out, so that the number of records associated with a combination of items (attributes) included in sensitive information is k or greater number, "local generalization" of items. The local generalization in the above description is a method to adjust the degree of generalization required for k-anonymization with respect to each record. Local generalization can reduce the degree of generalization (information loss). The related technology requires taxonomy for generalization. Further, this related technology has a problem in that unevenness in generalization, such as a certain attribute value is processed to generalized values which differ with respect to each record, is generated, and totaling is difficult.

A related technology described in NPL 4 carries out "global generalization (global recoding)" of items so that the number of records associated with a combination of items included in sensitive information becomes k or greater number. The global generalization in the above description is a method to determine what kind of value a certain attribute value is generalized to by considering k-anonymity and information loss of the whole of a data set. For example, it is assumed that taxonomy illustrated in FIG. 14 exists for values taken by a set-valued attribute referred to as disease name. When it is required that, to satisfy a desirable anonymity, a value of "A" included in the disease name attribute of a record is generalized to "nervous system", this related technology generalizes all disease names "A" in the data set to "nervous system". As described above, this related technology has a problem in that information loss of attribute values becomes excessively large.

A related technology described in NPL 5 carries out "global suppression" of items so that the number of records associated with a combination of items included in sensitive information is k or greater number. The global suppression in the above description is a method to determine whether or not a certain attribute value is removed by considering k-anonymity and information loss of the whole of a data set. This related technology removes an attribute value determined to be removed so as not to exist in the data set. Thus, this related technology has a problem in that the number of removed items is likely to increase.

A related technology described in NPL 6 carries out global generalization and removal of items so that the number of records associated with a combination of items included in sensitive information is k or greater number. This related technology requires taxonomy for generalization. This related technology can reduce information loss smaller than the technologies described in NPLs 4 and 5, and does not generate unevenness in generalization generated by the technology described in NPL 3.

CITATION LIST

Patent Literature

[PLT 1] Japanese Unexamined Patent Application Publication No. 2011-180839

[PLT 2] Japanese Unexamined Patent Application Publication No. 2012-003440

Non Patent Literature

[NPL 1] L. Sweeney, "k-anonymity: a model for protecting privacy", International Journal on Uncertainty, Fuzziness and Knowledge-Based Systems, Volume 10, Issue 05, pp. 555-570, October 2002.

[NPL 2] K. LeFevre, D. DeWitt and R. Ramakrishnan, "Mondrian Multidimensional k-Anonymity", Data Engineering, 2006. ICDE '06. Proceedings of the 22nd International Conference on Data Engineering, Page 25, April 2006.

[NPL 3] Yeye He and Jeffrey F. Naughton, "Anonymization of set-valued data via top-down, local generalization", International Conference on Very Large Databases, Volume 2, Issue 1, pp. 934-945, August 2009.

[NPL 4] M. Terrovits, N. Mamoulis and P. Kalnis, "Privacy Preserving Anonymization of Set-valued Data", Proceedings of the VLDB, Volume 1, Issue 1, pp. 115-125, August 2008

[NPL 5] Y. Xu, K. Wang, A. Fu and P. S. Yu, "Anonymizing Transaction Databases for Publication", KDD 2008, Proceedings of the 14th ACM SIGKDD international conference on Knowledge discovery and data mining, pp. 767-775.

[NPL 6] Junqiang Liu and Ke Wang, "Anonymizing Transaction Data by Integrating Suppression and Generalization", Advances in Knowledge Discovery and Data Mining Lecture Notes in Computer Science Volume 6118, 2010, pp 171-180.

SUMMARY OF INVENTION

Technical Problem

However, the related technology disclosed in the above-described NPL 6 has a problem in that the related technology is not suitable for anonymizing a set-valued attribute not provided taxonomy in a data set in which a single-valued attribute and a set-valued attribute coexist, in such a way as to be able to coexist in a scalable manner with another attribute.

Being "able to coexist with another attribute" means being able to be used together with any anonymization process for another attribute.

Being "able to coexist in a scalable manner" means that, even when the number of anonymization target attributes increases, the number of processed patterns required to be considered in anonymization does not become huge (does not invite a combination explosion).

In general, when trying to achieve an optimum k-anonymization, it is necessary to extract a pattern of processing (generalization and removal) that satisfies k-anonymity and minimizes the degree of processing required for satisfaction of k-anonymity. In this case, when the number of anonymization target attributes increases, it is required to consider at least two indices, namely satisfaction of k-anonymity and minimization of the degree of processing. Therefore, a combination explosion of number of processing patterns to be considered as candidates of anonymization can be caused.

For example, the related technologies described in PLT 1 and NPL 2 target single-valued attributes for anonymization. Thus, in PLT 1 and NPL 2, a case in which a set-valued attribute coexists as an anonymization target is not described.

The related technologies described in NPLs 3 to 6 target only one set-valued attribute. Thus, in NPLs 3 to 6, a case in which another single-valued attribute or set-valued attribute coexists is not described.

For example, when global generalization and removal are carried out for a data set in which a plurality of single-valued attributes and set-valued attributes coexist, a problem in that information loss increases is caused.

As described above, the k-anonymization technologies for a set-valued attribute described in NPLs 3 to 6 are not necessarily a technology that is able to coexist in a scalable manner with another attribute.

The related technology described in NPL 2 carries out anonymization, which is able to coexist in a scalable manner, for a data set including a plurality of single-valued attributes based on k-anonymization using a top-down approach.

The k-anonymization using the top-down approach first makes a data set a most generalized state (all attribute values are removed). Thereafter, the k-anonymization using the top-down approach repeats refinement of respective attributes within a range in which k-anonymity is satisfied. As described above, the k-anonymization using the top-down approach, after initializing a data set into a state in which all attribute values are most generalized, carries out refinement in a step-by-step manner so that the degree of processing decreases.

Therefore, in the k-anonymization using the top-down approach, minimization of the degree of processing is not always achieved. However, in the k-anonymization using the top-down approach, anonymization that minimizes the degree of processing locally is achieved speedily.

The k-anonymization using the top-down approach can employ any anonymization process for each attribute. The k-anonymization using the top-down approach carries out refinement by targeting one attribute in one refinement process.

However, an anonymization process for each attribute is required to be a top-down approach. In carrying out anonymization, the k-anonymization using the top-down approach may consider making the degree of processing of each attribute low. Therefore, the k-anonymization using the top-down approach does not cause a combination explosion of number of processing patterns required to be considered even when the number of anonymization target attributes increases.

The k-anonymization using the top-down approach, when the data set comes not to satisfy k-anonymity as a result of refinement, restores the state of an attribute back to the state before refinement.

As described above, the k-anonymization using the top-down approach can coexist a plurality of refinement processes of attributes in a scalable manner.

In such a k-anonymization process using the top-down approach for a plurality of attributes, application of an anonymization technology using the top-down approach to a set-valued attribute has had the following problem.

For example, the related technologies described in NPLs 3 and 6 are anonymization technologies using the top-down approach for the set-valued attribute. However, these related technologies do not consider coexistence with an anonymization process for another attribute. These related technologies assume that taxonomy is provided to a target set-valued attribute. However, taxonomy is not always provided to every set-valued attribute to be an anonymization target in advance. Accordingly, these related technologies have a problem in that the related technologies are not able to anonymize set-valued attributes not provided taxonomy in such a way as to be able to coexist in a scalable manner with another attribute value.

As an opposite approach to the top-down approach, k-anonymization using a bottom-up approach is known. The k-anonymization using the bottom-up approach achieves k-anonymity by using an optimum combination of records so as to minimize information loss caused by removal. However, because the k-anonymization using the bottom-up approach is required to search for a state that satisfies k-anonymity and causes a small amount of information loss from among a huge number of combinations when carrying out anonymization in which a plurality of attributes coexist, it takes a lot of time for an anonymization process.

The present invention is made to solve the above-described problem. The object of the present invention is to provide an anonymization technology to process a set-valued attribute without taxonomy provided in a data set in which a single-valued attribute and the set-valued attribute coexist in such a way as to be able to coexist with another attribute and in a scalable manner.

Solution to Problem

An information processing device according to an aspect of the present invention includes: a cluster information acquisition unit which acquires information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and a set-valued attribute refinement unit which discloses at least a portion of attribute values from among removed attribute values of the set-valued attributes of records included in the cluster acquired by the cluster acquisition, and divides the cluster into clusters which satisfy the predetermined anonymity based on the disclosed attribute values.

An information processing method according to an aspect of the present invention, includes: acquiring information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and disclosing at least a portion of attribute values from among removed attribute values of the set-valued attributes of records included in the cluster acquired, and dividing the cluster into clusters which satisfy the predetermined anonymity based on the disclosed attribute values.

A computer-readable non-transitory recording medium according to an aspect of the present invention, the medium embodying a program, the program causing an information processing device to perform a method, the method includes: acquiring information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and disclosing at least a portion of attribute values from among removed attribute values of the set-valued attributes of records included in the cluster acquired, and dividing the cluster into clusters which satisfy the predetermined anonymity based on the disclosed attribute values.

Advantageous Effects of Invention

The present invention is able to provide an anonymization technology to process a set-valued attribute without taxonomy provided in a data set in which a single-valued attribute and a set-valued attribute coexist in such a way as to be able to coexist with another attribute and in a scalable manner.

BRIEF DESCRIPTION OF DRAWINGS

FIG. 6 is a diagram illustrating an example of a data set which becomes an anonymization target according to the second exemplary embodiment.

FIG. 7 is a diagram illustrating an example of transition of the anonymized state of a set-valued attribute in a step-by-step anonymization process according to the second exemplary embodiment.

FIG. 10 is a diagram illustrating an example of cluster information held in an anonymization state holding unit according to the third exemplary embodiment.

FIG. 11 is a diagram illustrating an example of an index of information loss calculated in a refinement attribute selection unit according to the third exemplary embodiment.

DESCRIPTION OF EMBODIMENTS (First Exemplary Embodiment)

Figure 1:
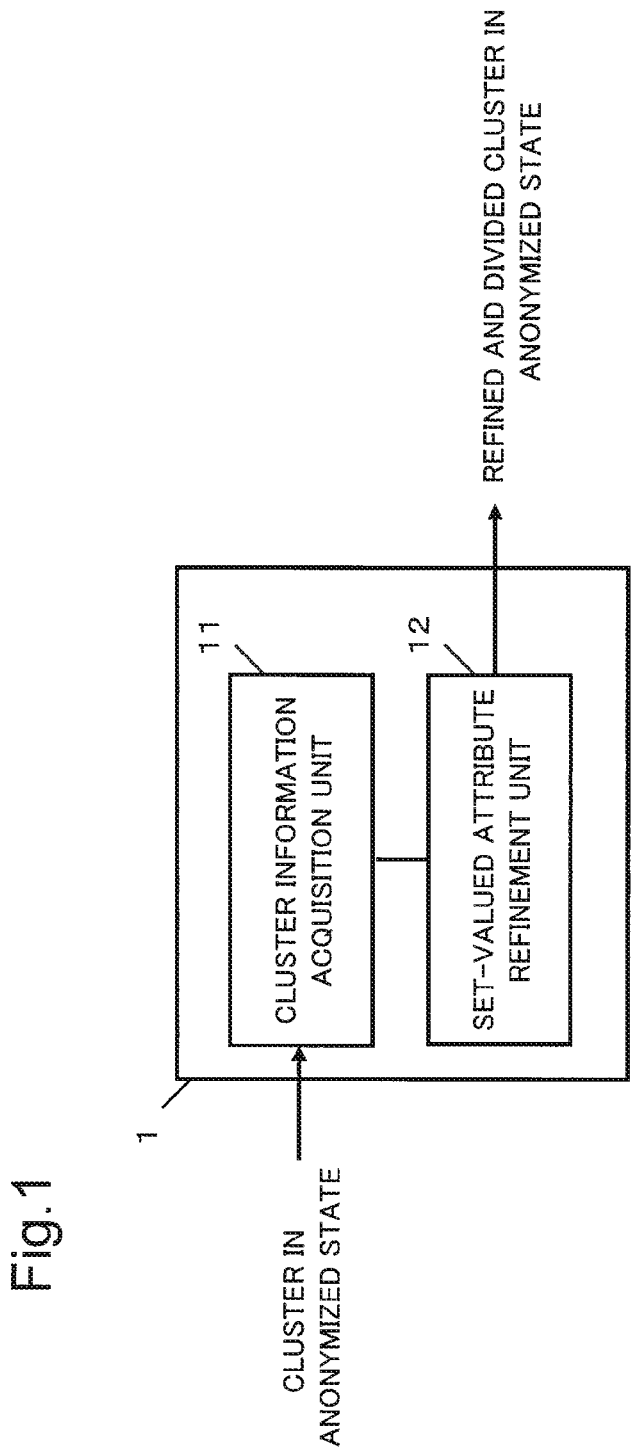
FIG. 1 is a block diagram illustrating an example of a configuration of an information processing device according to a first exemplary embodiment of the present invention.

A block configuration of an example of functions of an information processing device 1 as a first exemplary embodiment of the present invention is illustrated in FIG. 1. In FIG. 1, the information processing device 1 includes a cluster information acquisition unit 11 and a set-valued attribute refinement unit 12.

Figure 2:
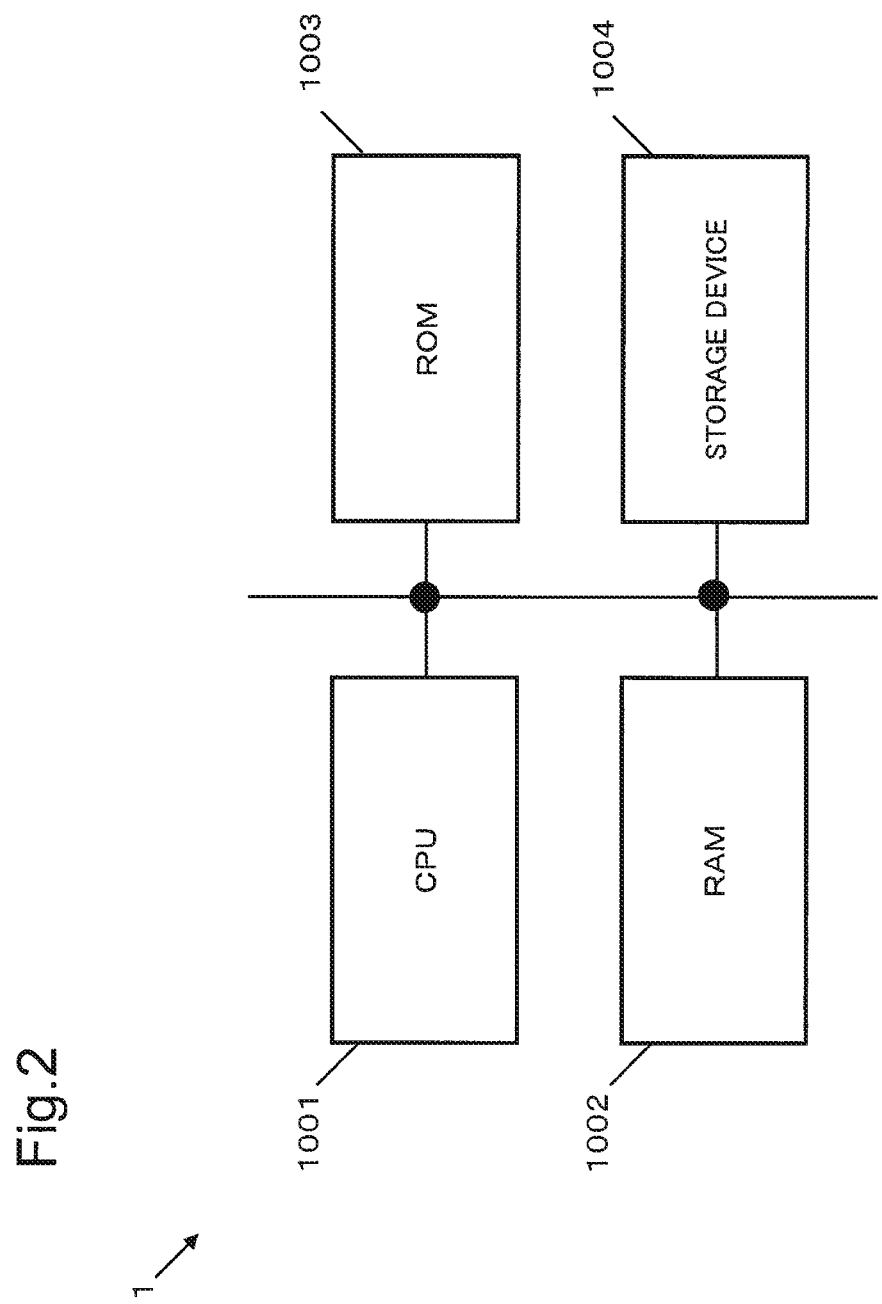
FIG. 2 is a block diagram illustrating an example of a hardware configuration of the information processing device according to the first exemplary embodiment.

An example of a hardware configuration of the information processing device 1 is illustrated in FIG. 2. As illustrated in FIG. 2, the information processing device 1 is configurable by using a computer device including a CPU (Central Processing Unit) 1001, a RAM (Random Access Memory) 1002, and a ROM (Read Only Memory) 1003. Further, the information processing device 1 is also configurable by using a computer device including a storage device 1004, such as a hard disk, illustrated in FIG. 2. In this case, the cluster information acquisition unit 11 and the set-valued attribute refinement unit 12 are configured based on the CPU 1001 which reads a program and various data stored in the ROM 1003 and the storage device 1004 into the RAM 1002 and executes the program. The hardware configuration with which the information processing device 1 and respective functional blocks thereof are configured is not limited to the configuration described above.

The cluster information acquisition unit 11 acquires information indicating a cluster which includes records (record group) in an anonymized state. The record group in an anonymized state is one or more records that are in a state in which at least a portion of attribute values of a set-valued attribute is removed so that the record group satisfies a predetermined anonymity. Therefore, in the following description, the record group includes a group of a case in which the group contains one record. "Removal of an attribute value" means that an attribute value is changed from an original value to a state in which the value is anonymized and not specifiable.

It is assumed that respective records in an original state are stored in a not-illustrated internal or external storage device. The original state means a state in which an attribute value taken by a set-valued attribute is not removed and remains at the original value.

A set-valued attribute means an attribute that can include one or a plurality of attribute values. For example, an attribute "drug name" is a set-valued attribute because the attribute can include one or a plurality of attribute values indicating drug names in a record which stores information indicating a medical prescription receipt of an individual.

The predetermined anonymity may, for example, be k-anonymity which is described in NPL 1. Alternatively, the predetermined anonymity may be another index of anonymity which indicates that a record group including privacy information is in a state in which no individual related to the privacy information is specifiable.

The information indicating a cluster acquired by the cluster information acquisition unit 11 may include reference information to records belonging to the cluster and a list of a common attribute value which is an attribute value common to a set-valued attribute of the respective records included in the cluster. The common attribute value is an attribute value that is disclosed in the set-valued attribute of the respective records.

"Disclosure" means returning an attribute value from an anonymized state to a state before anonymization. In other words, the "disclosure" means returning an attribute value to the original value thereof. Thus, an "undisclosed attribute value" is an attribute value in an anonymized state.

The set-valued attribute refinement unit 12 discloses at least a portion of attribute values in removed attribute values of the set-valued attribute in a target cluster. The set-valued attribute refinement unit 12 divides the target cluster into clusters which satisfy the predetermined anonymity based on the disclosed attribute value. In other words, the set-valued attribute refinement unit 12 divides the target cluster into a plurality of clusters which include a cluster satisfying the predetermined anonymity based on the disclosed attribute value.

As described above, the set-valued attribute refinement unit 12 discloses at least a portion of anonymized attribute values and divides a cluster. Hereinafter, these operations carried out by the set-valued attribute refinement unit 12 will be collectively referred to as "refinement".

Specifically, when the target cluster is dividable, the set-valued attribute refinement unit 12 discloses an attribute value and divides the cluster. For example, when k-anonymity is employed as the predetermined anonymity, the set-valued attribute refinement unit 12 is able to determine whether or not the target cluster is dividable based on whether or not the number of records in the target cluster is greater than k (k is an integer of 2 or greater). The set-valued attribute refinement unit 12 may also use another index for determining whether or not the target cluster is dividable. For example, the set-valued attribute refinement unit 12 may determine whether or not the target cluster is dividable based on whether or not an attribute value that possibly becomes a basis for division if the attribute value is disclosed exists among removed attribute values of the set-valued attribute in the target cluster. For example, when the number of clusters to be newly generated based on division is prescribed as p (p is an integer of 2 or greater), the set-valued attribute refinement unit 12 may determine that the target cluster is dividable when the number of records belonging to the target cluster is p×k or greater. The set-valued attribute refinement unit 12 may also determine whether or not the target cluster is dividable by combining a plurality of indices.

When the target cluster is dividable, the set-valued attribute refinement unit 12 selects an attribute value to be disclosed based on the original state of the respective records included in the target cluster. For example, the set-valued attribute refinement unit 12 may select a disclosed attribute value based on the number of disclosed attribute values (the number of items). For example, the set-valued attribute refinement unit 12 may select an attribute value of which the number of disclosed items is greater than number of other attribute values. Such the number of items is equivalent to a frequency of appearance of the attribute value in the record group in the original state. The set-valued attribute refinement unit 12 may select a disclosed attribute value based on similarities between records. For example, the set-valued attribute refinement unit 12 may select an attribute value of which the similarity between records is increased by disclosure. The set-valued attribute refinement unit 12 may select a disclosed attribute value based on degrees of priority which are set to attribute values in advance. The set-valued attribute refinement unit 12 may select a disclosed attribute value based on another index that directly or indirectly leads to a decrease in information loss caused by anonymization.

The set-valued attribute refinement unit 12 divides the target cluster into clusters which satisfy the predetermined anonymity based on the disclosed attribute value in the following way.

For example, the set-valued attribute refinement unit 12 may divide the target cluster into a cluster which is composed of a record group in which disclosed attribute value includes a set-valued attribute and a cluster which is composed of a record group in which disclosed attribute value does not include a set-valued attribute.

Alternatively, for example, the set-valued attribute refinement unit 12 may divide the target cluster into p clusters based on the degree of similarity using co-occurrence relations between original attribute values. In this case, for example, the set-valued attribute refinement unit 12 may divide the target cluster into clusters based on the degree of similarity using a k-means method. In this case, the set-valued attribute refinement unit 12 may disclose a common attribute value in a set-valued attribute of the respective p clusters.

Figure 3:
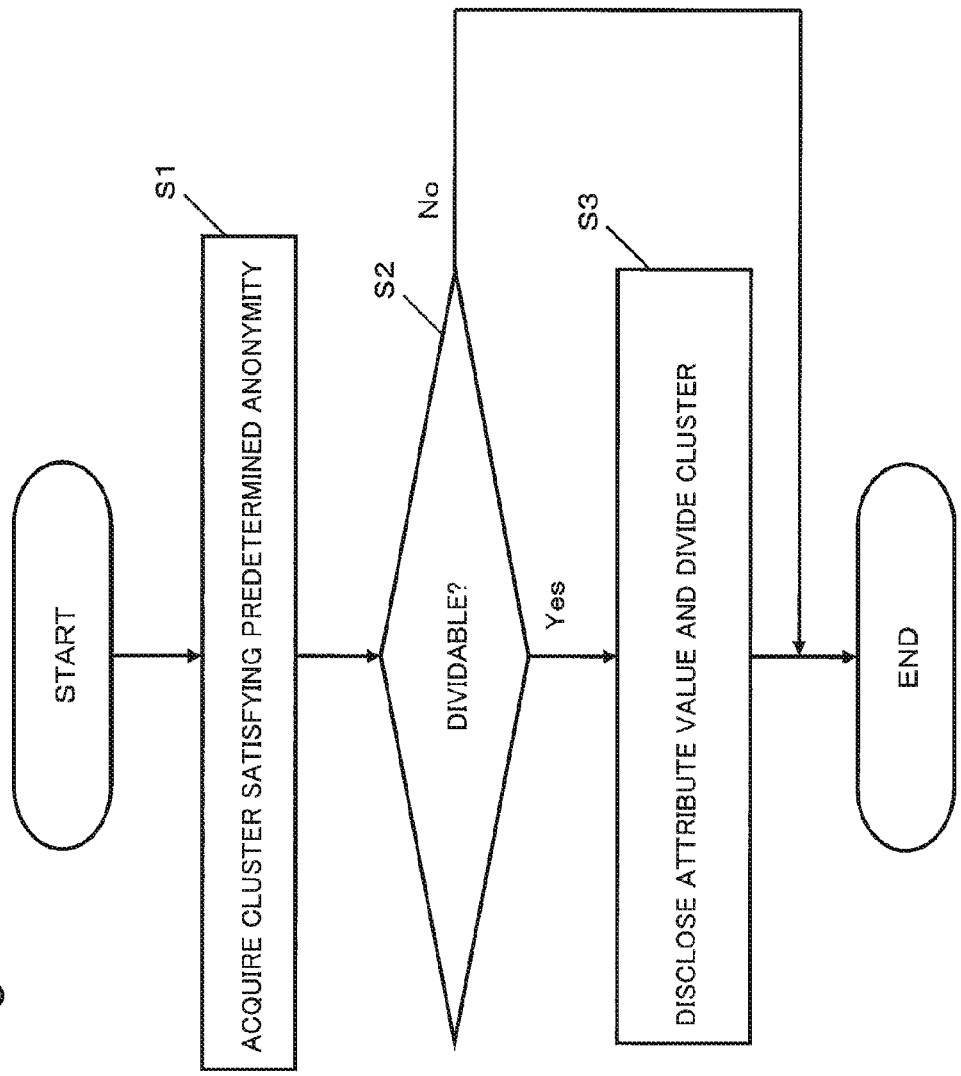
FIG. 3 is a flowchart describing an example of operations of the information processing device according to the first exemplary embodiment.

Operations of the information processing device 1 configured as described above will be described with reference to FIG. 3.

First, the cluster information acquisition unit 11 acquires information indicating a cluster that satisfies a predetermined anonymity (step S1). As described earlier, the cluster that satisfies the predetermined anonymity is a cluster composed of a record group in an anonymized state in which at least a portion of attribute values of a set-valued attribute in respective records is removed so that the record group belonging to the cluster satisfies the predetermined anonymity.

Next, the set-valued attribute refinement unit 12 determines whether or not the cluster indicated by the information acquired in step S1 is dividable into clusters which satisfy the predetermined anonymity (step S2). For example, as described earlier, the set-valued attribute refinement unit 12 may determine based on whether or not the number of records included in the target cluster is greater than k.

When the set-valued attribute refinement unit 12 determines that the target cluster is not dividable, the information processing device 1 ends the operation.

On the other hand, when the set-valued attribute refinement unit 12 determines that the target cluster is dividable, the set-valued attribute refinement unit 12 discloses at least a portion of attribute values in removed attribute values of the set-valued attribute in the target cluster. The set-valued attribute refinement unit 12 divides the target cluster into clusters which satisfy the predetermined anonymity based on the disclosed attribute value (step S3).

For example, as described earlier, the set-valued attribute refinement unit 12 may select a disclosed attribute value based on the number of items to be refined or the degrees of priority preset to attribute values. In this case, the set-valued attribute refinement unit 12 may divide the target cluster into a cluster composed of a record group including the disclosed attribute value and a cluster composed of a record group including no disclosed attribute value. Alternatively, as described earlier, the set-valued attribute refinement unit 12 may divide the target cluster into p clusters based on the degree of similarity using co-occurrence relations between the original attribute values, and disclose a common attribute value of the respective p clusters.

The set-valued attribute refinement unit 12 generates information indicating respective clusters which satisfy the predetermined anonymity after division. For example, as described earlier, the set-valued attribute refinement unit 12 may generate reference information to records belonging to the clusters and information including a list of a common attribute value in the clusters for the respective clusters which satisfy the predetermined anonymity after division. The respective clusters, generated in this way, which satisfy the predetermined anonymity after division can be provided as a target of a further anonymization process for the same set-valued attribute or a target of another anonymization process for another attribute.

At this point, the information processing device 1 ends the operation.

Next, an effect of the first exemplary embodiment of the present invention will be described.

The information processing device as the first exemplary embodiment of the present invention can anonymize a set-valued attribute not provided taxonomy in a data set in which a single-valued attribute and a set-valued attribute coexist, in such a way as to be able to coexist with another attribute and in a scalable manner.

The reason is as follows. First, the cluster information acquisition unit acquires information indicating a cluster which satisfies a predetermined anonymity. Then, the set-valued attribute refinement unit selects and discloses at least a portion of attribute values in removed attribute values of a set-valued attribute in records which are in an anonymized state and included in the acquired cluster. Then, the set-valued attribute refinement unit divides the target cluster into clusters which satisfy the predetermined anonymity based on the disclosed attribute value.

As described above, the exemplary embodiment divides a cluster which satisfies a predetermined anonymity by removal of at least a portion of attribute values of a set-valued attribute into clusters which satisfy the predetermined anonymity based on the disclosure of at least a portion of the removed attribute values. In other words, the exemplary embodiment carries out an anonymization process using a top-down approach for a set-valued attribute. Accordingly, the exemplary embodiment is capable of providing each cluster which satisfies the predetermined anonymity after division as a target of a further anonymization process for the same set-valued attribute or a target of another anonymization process for another attribute. The exemplary embodiment does not require taxonomy for an anonymization process using a top-down approach. Accordingly, the exemplary embodiment can be applied to an anonymization process for a set-valued attribute not provided taxonomy in an anonymization process using a top-down approach for a data set in which a plurality of attributes coexist.

(Second Exemplary Embodiment)

Next, a second exemplary embodiment according to the present invention will be described in detail with reference to the accompanying drawings. In respective drawings referenced in the description of the exemplary embodiment, identical signs are assigned to the same configuration and operation steps as the first exemplary embodiment and detailed description thereof in the exemplary embodiment will be omitted.

Figure 4:
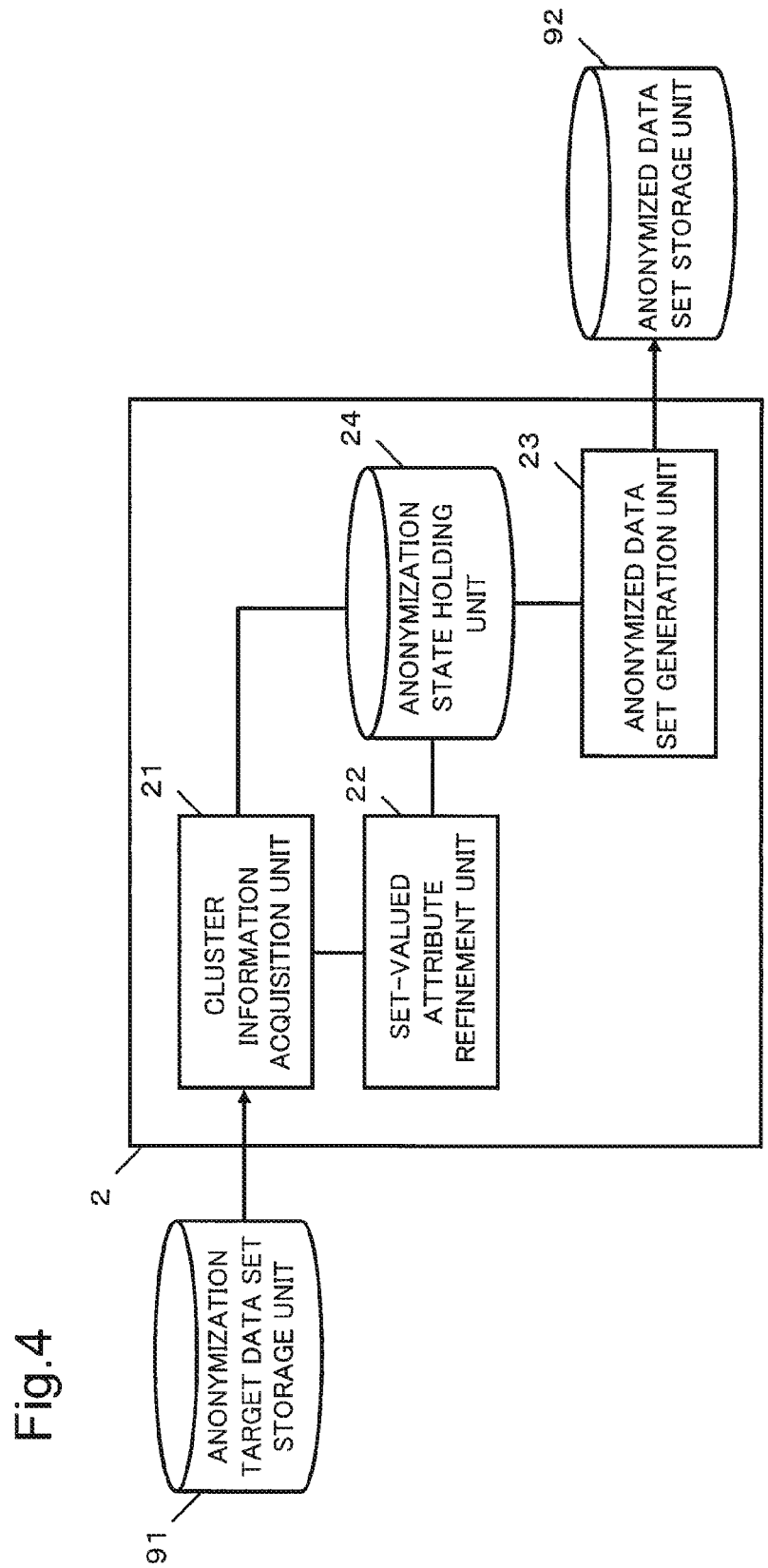
FIG. 4 is a block diagram illustrating an example of a configuration of an information processing device according to a second exemplary embodiment.

First, a functional block configuration of an information processing device 2 according to the second exemplary embodiment is illustrated in FIG. 4. In FIG. 4, the information processing device 2, in contrast with the information processing device 1 of the first exemplary embodiment, includes a cluster information acquisition unit 21 in replacement of the cluster information acquisition unit 11 and a set-valued attribute refinement unit 22 in replacement of the set-valued attribute refinement unit 12. Furthermore, the information processing device 2 includes an anonymized data set generation unit 23 and an anonymization state holding unit 24. The information processing device 2 differs from the information processing device 1 of the first exemplary embodiment in this point.

The anonymization state holding unit 24 is a functional block to temporarily hold information transmitted and received among the cluster information acquisition unit 21, the set-valued attribute refinement unit 22, and the anonymized data set generation unit 23. The anonymization state holding unit 24 composes a portion of an exemplary embodiment of the cluster information acquisition unit, the set-valued attribute refinement unit, and the anonymized data set generation unit in the present invention.

The information processing device 2 may be configured with a computer device that includes the same hardware components as the information processing device 1 of the first exemplary embodiment, which is described with reference to FIG. 2. In this case, the anonymized data set generation unit 23 is configured by using a CPU 1001 that reads a program and various data stored in a ROM 1003 and a storage device 1004 into a RAM 1002 and executes the program. The anonymization state holding unit 24 is configured by using a storage device. The hardware configuration composing the information processing device 2 and respective functional blocks thereof is not limited to the configuration described above.

In FIG. 4, the information processing device 2 is connected to an anonymization target data set storage unit 91 and an anonymized data set storage unit 92, which are disposed on the outside of the information processing device 2.

The anonymization target data set storage unit 91 stores an anonymization target data set. The anonymization target data set is configured including records (record group) which contain private information, the original contents of which are not desirable for publication or use thereof. Each of the anonymization target records is a record including at least one or more set-valued attributes. The anonymization target data set storage unit 91 holds the respective anonymization target records in an original state.

The anonymized data set storage unit 92 stores an anonymized data set which is applied an anonymization process by using the information processing device 2 to the anonymization target data set stored in the anonymization target data set storage unit 91.

The cluster information acquisition unit 21 acquires information indicating a cluster in which the anonymization state of an anonymization target set-valued attribute is initialized in respective records in the anonymization target data set. The cluster in which the anonymization state is initialized may be a cluster in which an anonymization target set-valued attribute is in a most generalized state in all records included in the anonymization target data set. The most generalized state may, for example, be a state in which every attribute value of the set-valued attribute is converted into indistinguishable information from the other attribute values. Alternatively, for example, the most generalized state may also be a state in which all attribute values of the set-valued attribute are removed.

The cluster information acquisition unit 21 holds the information indicating an initialized cluster in the anonymization state holding unit 24. As described earlier, information indicating a cluster includes reference information to records included in the cluster and information indicating a common attribute value in the cluster. For example, the cluster information acquisition unit 21 may, as the information indicating an initialized cluster, hold reference information to all records in the anonymization target data set and a common attribute value indicating a high-level concept of all attribute values in the anonymization state holding unit 24. In this case, for a set-valued attribute of all the records, removal of all attribute values thereof becomes conversion to a value indicating a high-level concept of all the attribute values.

The set-valued attribute refinement unit 22 is configured in a similar manner to the set-valued attribute refinement unit 12 of the first exemplary embodiment. The set-valued attribute refinement unit 22, when an initialized cluster is dividable, carries out refinement and division of a set-valued attribute in the initialized cluster. Further, the set-valued attribute refinement unit 22 repeats division while a cluster after division is dividable into clusters satisfying a predetermined anonymity. In detail, the set-valued attribute refinement unit 22, for the set-valued attribute in respective clusters after division, discloses at least a portion of attribute values in removed attribute values. The set-valued attribute refinement unit 22 should further divide the respective clusters after division into clusters satisfying the predetermined anonymity based on the disclosed attribute values.

Even when the target cluster is not dividable, if there is an attribute value, in the target cluster, that is capable to be disclosed while maintaining the predetermined anonymity, the set-valued attribute refinement unit 22 may disclose the attribute value.

The set-valued attribute refinement unit 22 repeats refinement of a set-valued attribute and division of a cluster, as described above, while holding the anonymization state of respective records included in the anonymization target data set in the anonymization state holding unit 24. For example, the set-valued attribute refinement unit 22 carries out refinement of a set-valued attribute in the initialized cluster and division of the cluster based on a result of reference to the anonymization state holding unit 24. Then, the set-valued attribute refinement unit 22 updates the anonymization state holding unit 24 in such a way as to hold reference information to a record included in the cluster and information indicating a disclosed attribute value (that is, a common attribute value) of a set-valued attribute in the cluster for each cluster after division. The set-valued attribute refinement unit 22 should update information indicating the cluster held in the anonymization state holding unit 24 for every repeat of refinement of the set-valued attribute and division of the cluster. When a cluster that does not satisfy the predetermined anonymity is generated in addition to a cluster that satisfies the predetermined anonymity based on division of the target cluster, the set-valued attribute refinement unit 22 does not have to hold information on such a cluster in the anonymization state holding unit 24.

The anonymized data set generation unit 23 generates an anonymized data set based on information indicating the respective clusters held in the anonymization state holding unit 24, and outputs it to the anonymized data set storage unit 92. The anonymized data set is a data set that is anonymized so that record groups composing an anonymization target data set satisfy a predetermined anonymity. Specifically, the anonymized data set generation unit 23 should generate a data set including a common attribute value which is disclosed in a cluster to which the record belongs for each record included in the anonymization target data set.

Figure 5:
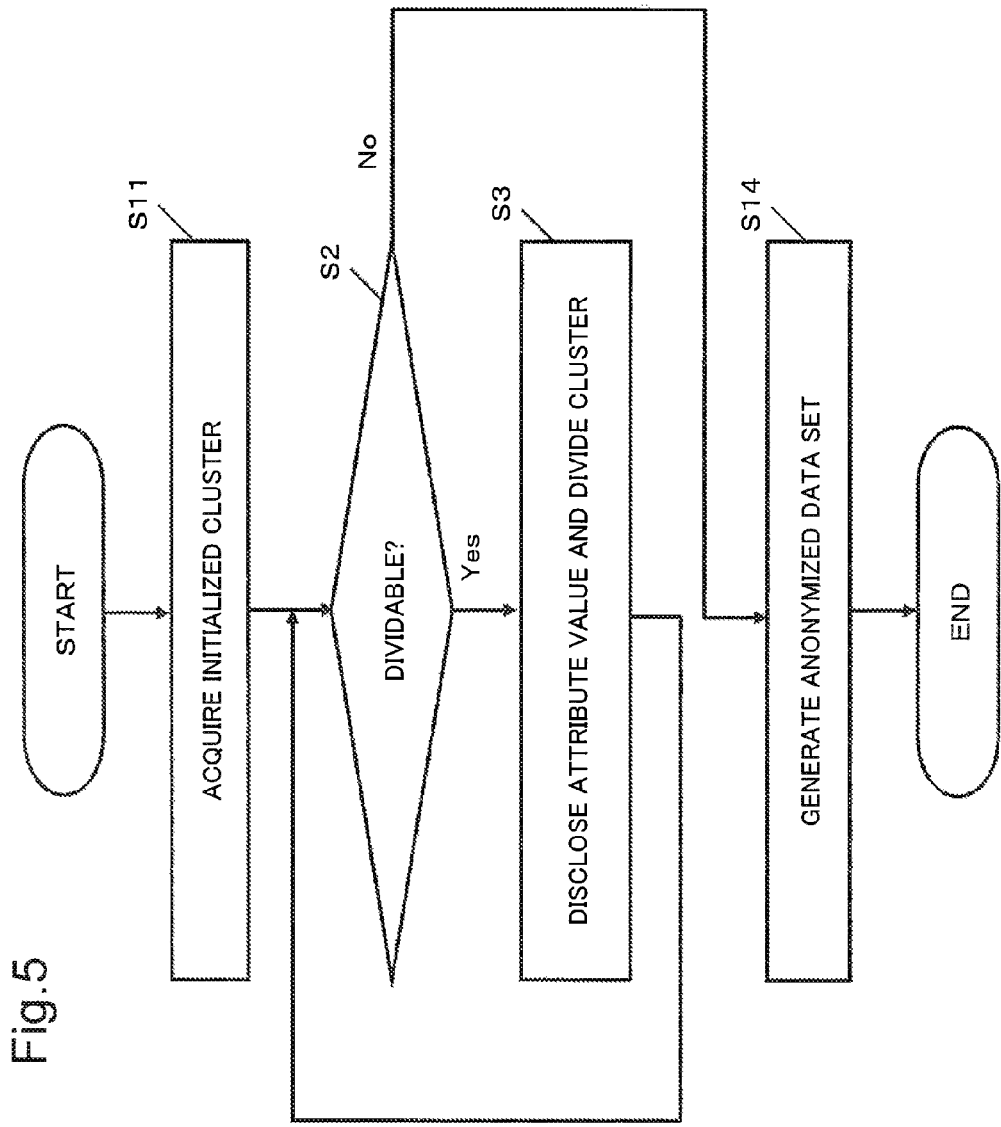
FIG. 5 is a flowchart describing an example of operations of the information processing device according to the second exemplary embodiment.

Operations of the information processing device 2, which is configured as described above, will be described with reference to FIG. 5.

First, the cluster information acquisition unit 21 acquires information indicating a cluster, the anonymization state of which is initialized, for the anonymization target data set (step S11). Then, the cluster information acquisition unit 21 holds the information indicating the initialized cluster in the anonymization state holding unit 24.

Next, the set-valued attribute refinement unit 22, as with the first exemplary embodiment, determines whether or not a target cluster is dividable into clusters which satisfy the predetermined anonymity (step S2).

When it is determined that the target cluster is dividable, the set-valued attribute refinement unit 22, as with the first exemplary embodiment, carries out refinement of a set-valued attribute in the target cluster and divides the target cluster (step S3). Then, the set-valued attribute refinement unit 22 holds reference information to a record belonging to the cluster and information indicating a common attribute value in the cluster in the anonymization state holding unit 24 for each cluster after division.

The set-valued attribute refinement unit 22 returns the operation to step S2 after step S3. When it is determined that the divided cluster is dividable again in step S2, the set-valued attribute refinement unit 22 repeats the process in step S3 by targeting a cluster indicated by the information held in the anonymization state holding unit 24.

That is, when it is determined that the divided cluster is dividable, the set-valued attribute refinement unit 22 repeats the processes in steps S2 to S3.

On the other hand, when it is determined that a target cluster is not dividable in step S2, the information processing device 2 ends repetitive processes in steps S2 to S3, and proceeds to the next step (step S14). At this time, when there is an attribute value that is capable to be disclosed while maintaining the predetermined anonymity for the target cluster, the set-valued attribute refinement unit 22 may proceed to the next step after disclosing the attribute value.

Next, the anonymized data set generation unit 23 generates an anonymized data set based on the anonymization state holding unit 24, and outputs it to the anonymized data set storage unit 92 (step S14). Specifically, the anonymized data set generation unit 23 generates a data set including a common attribute value which is disclosed in a cluster to which the record belongs for each record included in the anonymization target data set.

At this point, the information processing device 2 ends the operation.

Next, a specific example of operations of the information processing device 2 will be described. It is assumed that a data set illustrated in FIG. 6 is an anonymization target. FIG. 6 illustrates a data set of a record group which has a set-valued attribute referred to as drug name.

Transitions of the anonymization state of the data set illustrated in FIG. 6 are illustrated in FIG. 7. In FIG. 7, the first to ninth lines illustrate transitions of the anonymization state thereof about the set-valued attribute "drug name" of the nine records illustrated in FIG. 6. A column "drug name" illustrated in FIG. 7 indicates original attribute values of the set-valued attribute "drug name" in the respective records.

<Initial State>

First, the cluster information acquisition unit 21 acquires information indicating an initialized cluster from the data set illustrated in FIG. 6 (step S11). In FIG. 7, a column "initial state" indicates the set-valued attribute "drug name" of respective records in the initialized cluster. In this example, the initialized cluster includes nine records, and is in the most generalized state in which all original attribute values of the set-valued attribute "drug name" of the respective records are removed. In FIG. 7, a removed attribute value and a set of removed attribute values are denoted by a symbol "*". In other words, in this example, a set of attribute values of the set-valued attribute is in a state in which the set of attribute values is generalized to a value indicating a highest level concept, which is denoted by the symbol "*". Based on the generalization, the respective records come to be in a state in that which item existed and how many items existed in the set-valued attribute "drug name" are unidentifiable. In the anonymization state holding unit 24, the cluster information acquisition unit 21 holds reference information to the nine records and information indicating "*", which denotes the common attribute values in the "drug name" of the nine records, as information indicating an initialized cluster.

Then, the set-valued attribute refinement unit 22, as will be described below, repeats refinement of the set-valued attribute and division of cluster from iterations 1 to 4. In FIG. 7, each of columns from "iteration 1" to "iteration 4" indicates the states of the set-valued attribute "drug name" of the respective records in each of iterations.

<Iteration 1>

First, the set-valued attribute refinement unit 22 determines whether or not a cluster indicated by the information held in the anonymization state holding unit 24 is dividable.

In the following description, however, it is assumed that the value of "k" in the k-anonymity is "2".

The information, which indicates the initialized cluster and is held in the anonymization state holding unit 24, includes nine records, the number of which is greater than k=2. Thus, the set-valued attribute refinement unit 22 determines that the target cluster is dividable (Yes in step S2).

Next, the set-valued attribute refinement unit 22 selects and discloses an attribute value "a" among removed attribute values of the set-valued attribute "drug name" in the initialized cluster.

Specifically, the set-valued attribute refinement unit 22, for example, operates as follows.

An attribute value with the highest frequency of appearance has the greatest number of items to be disclosed. Thus, the set-valued attribute refinement unit 22 selects and discloses the attribute value "a" that has the highest frequency of appearance in the nine records based on reference to the original attribute values of the set-valued attribute "drug name" of the respective records. Then, the set-valued attribute refinement unit 22 divides the target cluster into a cluster that is composed of a record group including the attribute value "a" (hereinafter, referred to as cluster 1a) and a cluster that is composed of a record group not including the attribute value "a" (hereinafter, referred to as cluster 1b) (step S3).

In FIG. 7, the first to fourth lines of the column "iteration 1" illustrate the record group in the cluster 1a. The fifth to ninth lines of the column "iteration 1" illustrate the record group in the cluster 1b.

At this point of time, in the anonymization state holding unit 24, reference information to the records on the first to fourth lines and information indicating common attribute values "a, *" are held as information indicating the cluster 1a. As information indicating the cluster 1b, reference information to the records on the fifth to ninth lines and information indicating the common attribute value "*" are held in the anonymization state holding unit 24.

<Iteration 2>

Next, the set-valued attribute refinement unit 22 determines whether or not to be able to divide about the information which indicates the cluster 1a and is held in the anonymization state holding unit 24. At this point, the information indicating the cluster 1a includes four records, the number of which is greater than k=2. Thus, the set-valued attribute refinement unit 22 determines that the cluster 1a is dividable (Yes in step S2).

At this time, in the set-valued attribute "drug name" of the four records in the cluster 1a, an attribute value with the highest frequency of appearance other than the attribute value "a" is an attribute value "d". Thus, the set-valued attribute refinement unit 22 selects and discloses the attribute value "d" among the removed attribute values of the set-valued attribute "drug name" in the cluster 1a. Then, the set-valued attribute refinement unit 22 divides the cluster 1a into a record group including the attribute value "d" (hereinafter, referred to as cluster 2a) and a record group not including the attribute value "d" (hereinafter, referred to as cluster 2b) (step S3).

In FIG. 7, the first and third lines of the column "iteration 2" illustrate the record group of the cluster 2a. The second and fourth lines of the column "iteration 2" illustrate the record group of the cluster 2b.

The set-valued attribute refinement unit 22 also determines whether or not to be able to divide about the information which indicates the other cluster 1b and is held in the anonymization state holding unit 24. The information indicating the cluster 1b includes five records, the number of which is greater than k=2. Thus, the set-valued attribute refinement unit 22 determines that the cluster 1b is dividable (Yes in step S2).

At this time, in the set-valued attribute "drug name" of the five records in the cluster 1b, an attribute value with the highest frequency of appearance is an attribute value "e". Thus, the set-valued attribute refinement unit 22 selects and discloses the attribute value "e" among the removed attribute values of the set-valued attribute "drug name" in the cluster 1b. Then, the set-valued attribute refinement unit 22 divides the cluster 1b into a record group including the attribute value "e" (hereinafter, referred to as cluster 2c) and a record group not including the attribute value "e" (hereinafter, referred to as cluster 2d) (step S3).

In FIG. 7, the sixth, seventh, and ninth lines of the column "iteration 2" illustrate the record group of the cluster 2c. The fifth and eighth lines of the column "iteration 2" illustrate the record group of the cluster 2d.

At this point of time, as information indicating the cluster 2a, reference information to the records on the first and third lines and information indicating common attribute values "a, d, *" are held in the anonymization state holding unit 24. As information indicating the cluster 2b, reference information to the records on the second and fourth lines and information indicating common attribute values "a, *" are also held. As information indicating the cluster 2c, reference information to the records on the sixth, seventh, and ninth lines and information indicating common attribute values "e, *" are also held. As information indicating the cluster 2d, reference information to the records on the fifth and eighth lines and information indicating common attribute value "*" are also held.

<Iteration 3>

Next, the set-valued attribute refinement unit 22 determines whether or not to be able to divide about the information which indicates the cluster 2a and is held in the anonymization state holding unit 24. The cluster 2a includes two records and does not include greater than k=2 records. Thus, the set-valued attribute refinement unit 22 determines that the cluster 2a is not dividable (No in step S2). Therefore, the set-valued attribute refinement unit 22 does not divide the cluster 2a any longer.

The set-valued attribute refinement unit 22 determines whether or not to be able to divide about the information which indicates the cluster 2b and is held in the anonymization state holding unit 24. The cluster 2b includes two records and does not include greater than k=2 records. Thus, the set-valued attribute refinement unit 22 determines that the cluster 2b is not dividable (No in step S2). However, the cluster 2b includes an attribute value "f" which is capable to be disclosed while maintaining k-anonymity of the cluster 2b. Therefore, the set-valued attribute refinement unit 22 dose not divide the cluster 2b but discloses the attribute value "f".

The set-valued attribute refinement unit 22 determines whether or not to be able to divide about the information which indicates the cluster 2c and is held in the anonymization state holding unit 24. The cluster 2c includes three records, the number of which is greater than k=2. However, the cluster 2c does not include an attribute value that becomes a standard of division. Thus, the set-valued attribute refinement unit 22 determines that the cluster 2c is not dividable (No in step S2). However, the cluster 2c includes an attribute value "x" which is capable to be disclosed while maintaining k-anonymity of the cluster 2c. Therefore, the set-valued attribute refinement unit 22 does not divide the cluster 2c but discloses the attribute value "x".

The set-valued attribute refinement unit 22 determines whether or not to be able to divide about the information which indicates the cluster 2d and is held in the anonymization state holding unit 24. The cluster 2d includes two records and does not include greater than k=2 records. Thus, the set-valued attribute refinement unit 22 determines that the cluster 2d is not dividable (No in step S2). However, the cluster 2d includes an attribute value "b" which is capable to be disclosed while maintaining k-anonymity of the cluster 2d. Therefore, the set-valued attribute refinement unit 22 does not divide the cluster 2d but discloses the attribute value "b".

At this point of time, in the anonymization state holding unit 24, the information indicating the cluster 2a is not updated. The information indicating the common attribute values of the cluster 2b is updated to "a, f, *". Further, the information indicating the common attribute values of the cluster 2c is updated to "e, x, *". Further, the information indicating the common attribute value of the cluster 2d is updated to "b, *".

<Iteration 4>

Next, the set-valued attribute refinement unit 22 determines that it is not able to divide about the information which indicates the clusters 2a to 2d and is held in anonymization state holding unit 24 same as the iteration 3 (No in step S2).

However, the cluster 2b includes an attribute value "g" which is further capable to be disclosed while maintaining k-anonymity of the cluster 2b. Therefore, the set-valued attribute refinement unit 22 does not divide the cluster 2b but discloses the attribute value "g".

The cluster 2d includes an attribute value "c" which is capable to be disclosed while maintaining k-anonymity of the cluster 2d. Therefore, the set-valued attribute refinement unit 22 does not divide the cluster 2d but discloses the attribute value "c".

At this point of time, in the anonymization state holding unit 24, the information indicating the clusters 2a and 2c is not updated. The information indicating the common attribute values of the cluster 2b is updated to "a, f, g, *". The information indicating the common attribute values of the cluster 2d is updated to "b, c, *".

Next, because it is not able to divide about the information which indicates the clusters 2a to 2d and is held in the anonymization state holding unit 24, and there is no attribute value which is capable to be disclosed any longer, the set-valued attribute refinement unit 22 proceeds to the next step.

<Generation of Anonymized Data Set>

When the refinement and division process of a cluster converges (is completed) as described above, the anonymized data set generation unit 23 generates an anonymized data set, based on the information of the respective clusters that are generated in the end (the iteration 4 in FIG. 7). Specifically, the anonymized data set generation unit 23 generates an anonymized data set which includes the common attribute values illustrated in the iteration 4 in FIG. 7 in the set-valued attribute "drug name" of the respective records on the first to ninth lines illustrated in FIG. 6. For example, the anonymized data set generation unit 23 makes the record of the first line an anonymized state by including the common attribute values "a, d" in the set-valued attribute "drug name". The anonymized data set generation unit 23 may or may not include the symbol "*", which is recorded as a common attribute value, in an anonymized record.

When it is required to maintain the number of attributes included in a set-valued attribute for respective records between before and after anonymization, the anonymized data set generation unit 23 may include "the attribute values of the highest level concept", whose number is same as the number of undisclosed attribute values, in the set-valued attribute "drug name" of the respective records in addition to a disclosed attribute value. The attribute value of the highest level concept is, for example, an attribute value denoted by "*" illustrated in FIG. 7. For example, the record on the third line in FIG. 7 includes five drug names as the set-valued attribute "drug name". Thus, the anonymized data set generation unit 23 may generate an anonymized data set as "a, d, *, *, *" by adding "*" in the set-valued attribute "drug name" of the record on the third line.

Hereinbefore, the description of a specific example of operations of the information processing device 2 has been completed.

Next, an effect of the second exemplary embodiment of the present invention will be described.

The information processing device as the second exemplary embodiment is, for a data set in which a single-valued attribute and a set-valued attribute coexist, capable of generating an anonymized data set with a significant benefit while processing the set-valued attribute not to provided taxonomy in such way that the set-valued attribute is able to coexist with another attribute and in a scalable manner.

The reason is because the cluster information acquisition unit acquires information indicating a cluster, in which the anonymization state of a set-valued attribute of all records is initialized, from the anonymization target data set. Then, the set-valued attribute refinement unit discloses an attribute value in the initialized cluster, and divides the initialized cluster into clusters which satisfy a predetermined anonymity, and repeats further disclosure of an attribute and division of the cluster into clusters which satisfy the predetermined anonymity for each cluster after division. Then, the anonymized data set generation unit generates an anonymized data set based on a common attribute value which is disclosed in information indicating the cluster after division.

As described above, the exemplary embodiment performs an anonymization process of the set-valued attribute by using step-by-step disclosure of an attribute value by using the top-down approach. It may be said that such a refinement process is an anonymization process by using local removal (or local disclosure). In other words, an attribute value which is removed based on the anonymization process is limited locally. Therefore, an anonymization process by using local removal (or local disclosure) has a small number of removed attribute values.

On the other hand, an anonymization process by using global removal (or global disclosure), which is related to the present invention, removes target items from all records even when it is required to remove items in a portion of the records to satisfy a predetermined anonymity. As a result, these anonymization processes remove a greater number of items than the exemplary embodiment.

As described above, the exemplary embodiment can achieves an anonymization process that decreases the number of removed attribute values to satisfy a predetermined anonymity, and increases the number of disclosed attribute values.

For the exemplary embodiment, a high convergence in the step-by-step anonymization process of a set-valued attribute can be expected because the exemplary embodiment is a local process. As a result, the exemplary embodiment achieve an anonymization process by using a step-by-step removal process, which can coexist with an anonymization process of another attribute, and can generate an anonymized data set with a more significant benefit, even when there is no taxonomy for the set-valued attribute.

(Third Exemplary Embodiment)

Next, a third exemplary embodiment of the present invention will be described in detail with reference to the accompanying drawings. In the exemplary embodiment, an example in which anonymization of a single-valued attribute and anonymization of a set-valued attribute, which have been proposed independently in general related technologies related to the present invention, are processed in a unified manner will be described. In respective drawings referenced in the description of the exemplary embodiment, identical signs will be assigned to the same configuration and a step with the same operation as the first and second exemplary embodiments, and detailed description thereof in the exemplary embodiment will be omitted.

Figure 8:
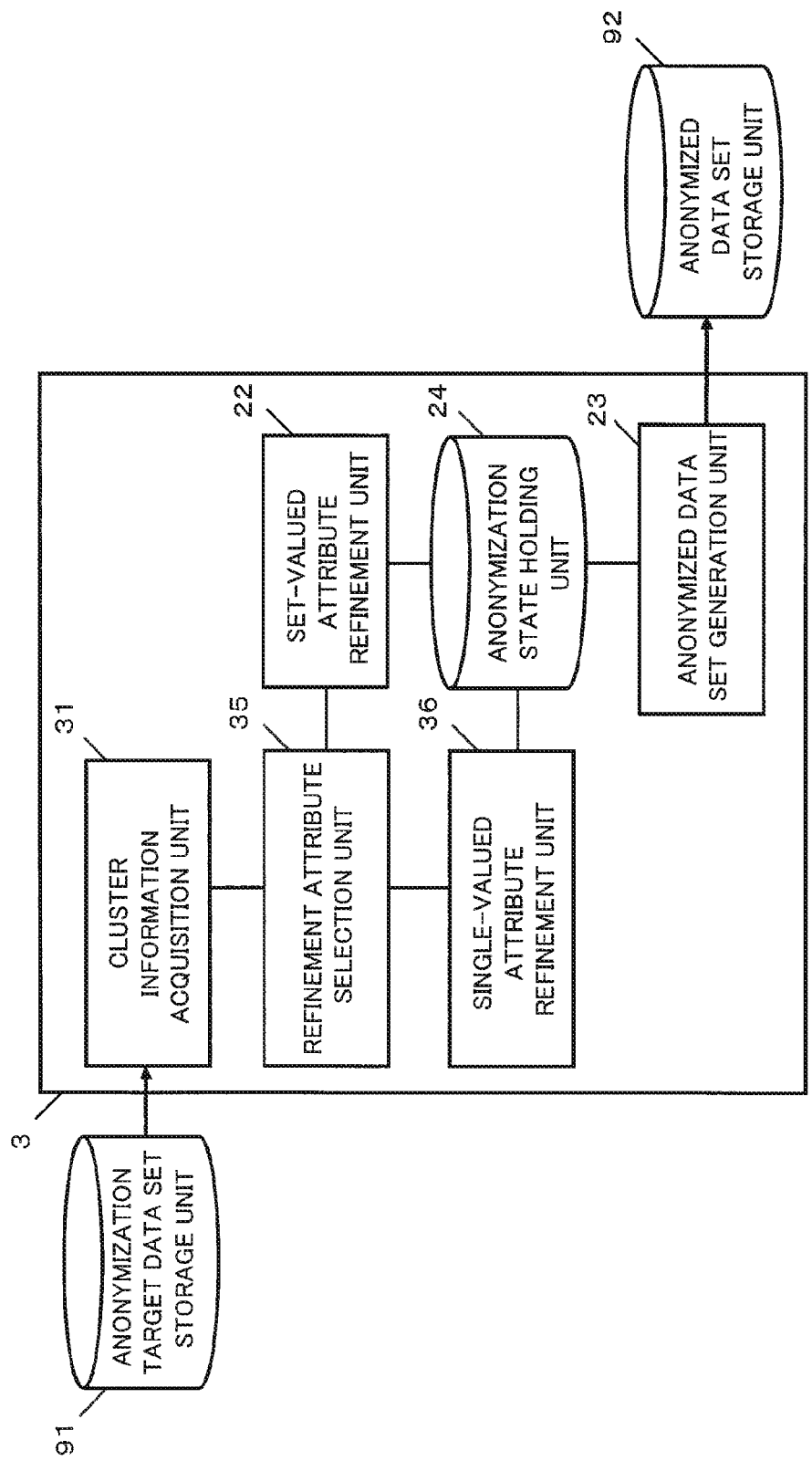
FIG. 8 is a block diagram illustrating an example of a configuration of an information processing device according to a third exemplary embodiment.

First, a block configuration of an example of a configuration of an information processing device 3 according to the third exemplary embodiment is illustrated in FIG. 8.

In FIG. 8, the information processing device 3 differs from the information processing device 2 of the second exemplary embodiment in a point in that the information processing device 3 includes a cluster information acquisition unit 31 in replacement of the cluster information acquisition unit 21 and further includes a refinement attribute selection unit 35 and a single-valued attribute refinement unit 36.

It is possible to configure the information processing device 3 by using a computer device that includes the same hardware components as the information processing device 1 of the first exemplary embodiment, which is described with reference to FIG. 2. In this case, the refinement attribute selection unit 35 and the single-valued attribute refinement unit 36 are configured by using a CPU 1001 that reads a program and various data, stored in a ROM 1003 and a storage device 1004, in a RAM 1002 and executes the program.

The hardware configuration which composes the information processing device 3 and respective functional blocks thereof is, however, not limited to the above-described configuration.

In FIG. 8, the information processing device 3, as with the information processing device 2 of the second exemplary embodiment, is connected to an anonymization target data set storage unit 91 and an anonymized data set storage unit 92 on the outside thereof.

The cluster information acquisition unit 31 acquires information indicating a cluster in which the anonymization state of a respective anonymization target attribute is initialized in all records included in an anonymization target data set.

A value taken by the attribute of the respective records in the initialized cluster, which is acquired by the cluster information acquisition unit 31, is in a most generalized state. However, the most generalized state may differ for each attribute.

For example, an attribute value of a set-valued attribute not provided taxonomy may be generalized to information indicating "*", which is a high level concept of all attribute values. An attribute value of an attribute referred to as gender, which is a single-valued attribute, may be generalized to information indicating "Any", which is a high level concept of "Male" and "Female". An attribute value of an attribute referred to as year of birth, which is a single-valued attribute, may be generalized to information indicating a range encompassing all values of the year of birth in the data set (for example, "1970-2001"). An attribute value of a set-valued attribute having taxonomy may be generalized to a value of the root node of the taxonomy.

The refinement attribute selection unit 35 selects an attribute that is to be a refinement target.

For example, the refinement attribute selection unit 35 selects an attribute to be a refinement target based on the magnitude of information loss, the order of the degree of priority, or an index based on a combination thereof.

Alternatively, the refinement attribute selection unit 35 may select an attribute to be a refinement target based on any other criterion. For example, the refinement attribute selection unit 35 may select an attribute to be a refinement target based on an index indicating the degree of information loss when the attribute is in an anonymized state. As the index indicating the degree of information loss, for example, there is an NCP (Normalized Certainty Penalty) value. The refinement attribute selection unit 35 may calculate an NCP value about each attribute and select an attribute with the greatest NCP value.

The refinement attribute selection unit 35 may select an attribute to be a refinement target by using a DM (Discernibility Metric) value as an index indicating the degree of difficulty in distinguishing a record. The refinement attribute selection unit 35 may also calculate a value indicating information gain which is calculated with refinement of each attribute, and select an attribute with the highest gain. The refinement attribute selection unit 35 may also select, based on the absolute or relative degree of priority of attributes, an attribute with the highest degree of priority.

The refinement attribute selection unit 35 may also select an attribute to be a refinement target based on an index differing for each attribute. In this case, the refinement attribute selection unit 35 makes the index value comparable by applying a process, such as normalization, to each index value for each attribute after calculating each value to be an index. The refinement attribute selection unit 35 may then select an attribute to be a refinement target based on the comparable index values.

Moreover, the refinement attribute selection unit 35 may select an attribute to be a refinement target based on an order preassigned to each attribute.

For example, the refinement attribute selection unit 35 can calculate an NCP value for a set-valued attribute $\alpha$ based on the following formulae (1) and (2). Hereinafter, an NCP value for a set-valued attribute is denoted by $NCP_{SV}$. "$NCP_{SV}=0$" indicates a state in which all attribute values remain without being removed (original state). "$NCP_{SV}=1$" indicates a state in which all attribute values are removed. The value of $NCP_{SV}$ increases when an attribute value in a record is removed, and decreases when an attribute value is disclosed.

$$NCP_{SV}(r'_i[\alpha]) = \frac{|r_i[\alpha]| - |r'_i[\alpha]|}{|r_i[\alpha]|} \quad (1)$$

$$NCP_{SV}(\alpha) = \sum_{r_i \in R} NCP_{SV}(r_i[\alpha]) \quad (2)$$

The formula (1) derives $NCP_{SV}$ for the set-valued attribute α of the i-th record. $r_i[\alpha]$ indicates the original value of the set-valued attribute α of the i-th record. For example, in the data set illustrated in FIG. 6, $r_1$[drug name] is {a, b, d}. $|r_i[\alpha]|$ indicates the number of elements of $r_i[\alpha]$ (the number of attribute values). For example, in the example in FIG. 6, $|r_1$[drug name]$|$ is "3". $r'_i[\alpha]$ indicates a value of the set-valued attribute α in state that at least a portion of the attribute values thereof is disclosed (or removed). For example, in the iteration 1 illustrated in FIG. 7, $r'_1$[drug name] is {a}.

The formula (2) indicates that $NCP_{SV}$ of the set-valued attribute α in a certain record group is the total sum of $NCP_{SV}$'s of all records.

The refinement attribute selection unit 35 informs a functional block carrying out an appropriate refinement process of an attribute selected as a target of refinement. For example, when the refinement attribute selection unit 35 selects a set-valued attribute as a target of refinement, the refinement attribute selection unit 35 informs the set-valued attribute refinement unit 22 of refinement of the set-valued attribute and division of a cluster. When the refinement attribute selection unit 35 selects a single-valued attribute as a target of refinement, for example, the refinement attribute selection unit 35 informs the single-valued attribute refinement unit 36, which will be described later, of refinement of the single-valued attribute and division of a cluster.

The single-valued attribute refinement unit 36 refines an attribute value of a single-valued attribute from the attribute value in a generalized state, and divides a target cluster into clusters satisfying a predetermined anonymity. The single-valued attribute refinement unit 36, as with the set-valued attribute refinement unit 22, holds information indicating clusters after division in the anonymization state holding unit 24.

The single-valued attribute refinement unit 36 may use a refinement method for a single-valued attribute by using a general top-down approach. For example, the single-valued attribute refinement unit 36 may use a group division method or a clustering method. When taxonomy for a portion of attributes exists, the single-valued attribute refinement unit 36 may use a method of division to children states based on the taxonomy. Alternatively, the single-valued attribute refinement unit 36 may use, for example, an index of including/not including a certain attribute value or being greater/smaller than a certain attribute value. Further, the single-valued attribute refinement unit 36 may, by using a combination of the above-described division method and an index, refine a single-valued attribute and divide a cluster into a plurality of clusters.

However, the single-valued attribute refinement unit 36 divides records in such a way that new clusters after division satisfy a predetermined anonymity (for example, k-anonymity).

When a record that does not belong to any cluster is generated as a result of division, the single-valued attribute refinement unit 36 does not have to hold reference information to the record in the anonymization state holding unit 24.

In a case in which k-anonymity is employed as a predetermined anonymity, the single-valued attribute refinement unit 36 does not have to hold information on the cluster in the anonymization state holding unit 24 when the single-valued attribute refinement unit 36 generates a cluster, the number of records of which is less than k.

Figure 9:
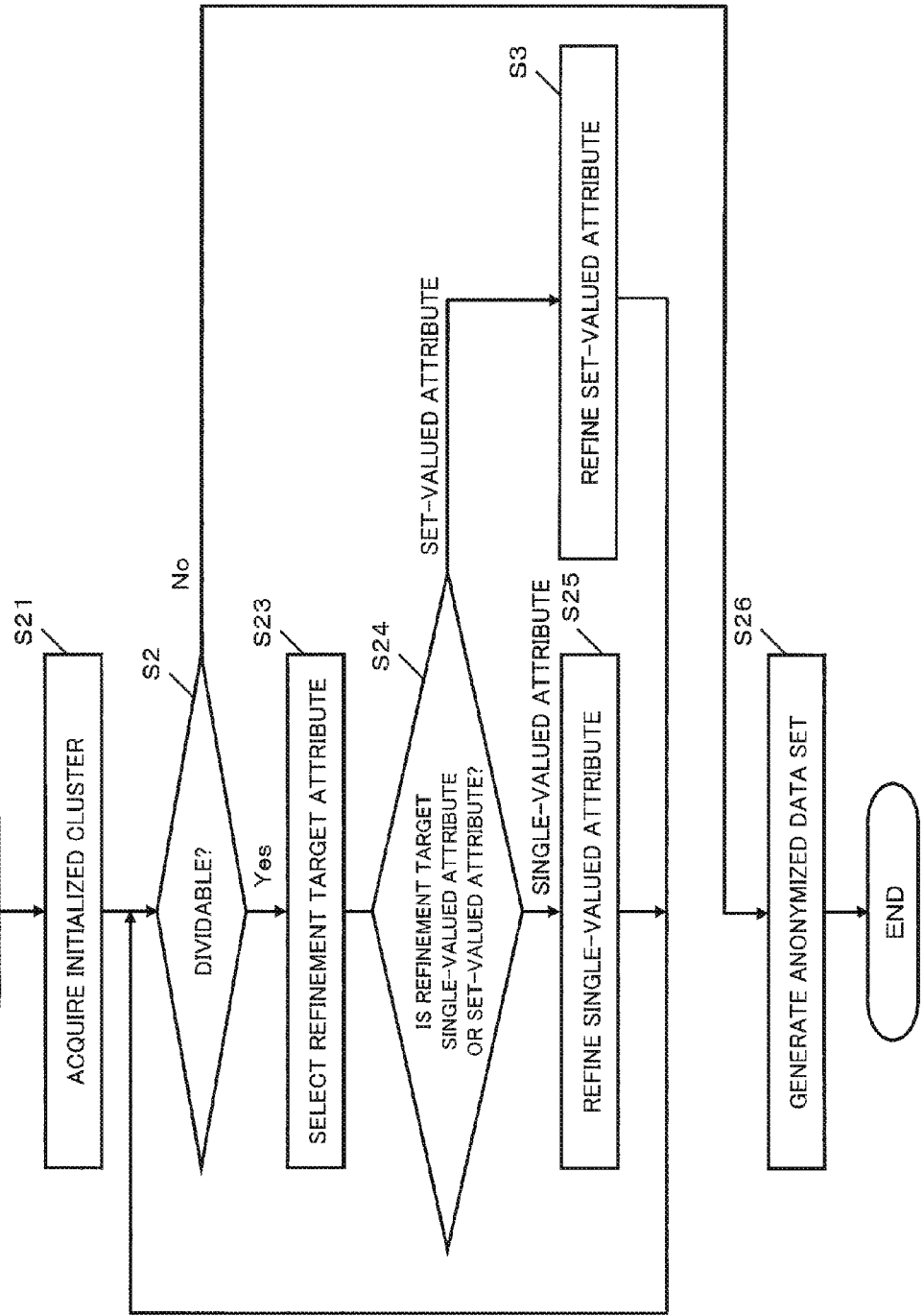
FIG. 9 is a flowchart describing an example of operations of the information processing device according to the third exemplary embodiment.

Operations of the information processing device 3, which is configured as described above, will be described with reference to FIG. 9.

First, the cluster information acquisition unit 31 acquires information indicating an initialized cluster by referring to the anonymization target data set storage unit 91 (step S21). For example, as described earlier, the cluster information acquisition unit 31 may acquire information indicating a cluster that is in a state in which an attribute value of respective attributes is generalized most, in all records composing an anonymization target data set. The cluster information acquisition unit 31 holds the information indicating the initialized cluster in the anonymization state holding unit 24.

Next, the set-valued attribute refinement unit 22, as with the first exemplary embodiment, determines whether or not the target cluster is dividable into clusters satisfying the predetermined anonymity (step S2).

When the set-valued attribute refinement unit 22 determines that the target cluster is dividable, the refinement attribute selection unit 35 selects an attribute targeted in refinement (step S23). For example, as described earlier, the refinement attribute selection unit 35 may calculate NCP values of respective attributes, and select an attribute with the greatest NCP value as a refinement target. In this time, the refinement attribute selection unit 35 may calculate $NCP_{SV}$'s for set-valued attributes by using the above-described formulas (1) and (2), and select an attribute value.

Next, the refinement attribute selection unit 35 determines whether the attribute selected in step S23 is a set-valued attribute or a single-valued attribute (step S24).

When the attribute is determined to be a set-valued attribute, the set-valued attribute refinement unit 22, as with the second exemplary embodiment, refines the set-valued attribute in the target cluster, divides the target cluster, and holds information indicating clusters after division in the anonymization state holding unit 24 (step S3).

In this time, the set-valued attribute refinement unit 22 may carry out refinement of the set-valued attribute in the target cluster and division of the target cluster two or more times. In this case, for example, the set-valued attribute refinement unit 22 may repeat refinement of the set-valued attribute in the target cluster and division of the target cluster until a predetermined natural number (V) of items are disclosed. The set-valued attribute refinement unit 22 may also repeat refinement of the set-valued attribute in the target cluster and division of the target cluster until items as many as the number of records equivalent to a predetermined ratio (β%) of the total number of records in the data set are disclosed. The set-valued attribute refinement unit 22 may also repeat refinement of the set-valued attribute in the target cluster and division of the target cluster until an index of information loss or information gain surpasses or is lower than a predetermined threshold value. The set-valued attribute refinement unit 22 may also repeat refinement and division of the set-valued attribute for a portion of two or more new clusters which are generated based on division.

On the other hand, when it is determined that the attribute is a single-valued attribute in step S24, the single-valued attribute refinement unit 36 divides the target cluster into clusters which satisfy the predetermined anonymity based on refinement of a single-valued attribute (step S25). Then, the single-valued attribute refinement unit 36 holds information indicating the clusters after division in the anonymization state holding unit 24. For example, the single-valued attribute refinement unit 36 may divide the cluster into a plurality of new clusters based on the refined single-valued attribute by using a combination of a method and an index described earlier.

When, in step S2, it is determined that the target cluster is dividable, the information processing device 3 repeats processes from step S23 to step S3 or step S25 by targeting respective clusters indicated by the information held in the anonymization state holding unit 24.

When, in step S2, it is determined that the target cluster is not dividable, the information processing device 3 ends the division process, and proceeds the operation to step S26.

An example of information indicating clusters, which is recorded in the anonymization state holding unit 24, is illustrated in FIG. 10.

In FIG. 10, for example, a cluster with a cluster identifier of 1 holds "1970-1979" for single-valued attributes "year of birth" and "ANY" for single-valued attributes "gender" as common attribute values. Further, the cluster with a cluster identifier of 1 holds "Biofermin (registered trademark), Tamiflu (registered trademark)" for set-valued attributes "drug name" and "influenza" for set-valued attributes "disease name".

When the division process has converged (been completed), the anonymized data set generation unit 23 generates an anonymized data set by referring to the anonymization state holding unit 24 (step S26). Specifically, the anonymized data set generation unit 23 should generate records including a common attribute value in a cluster to which the record belongs into respective attributes of respective records included in the anonymization target data set.

At this point, the information processing device 3 ends the operation.

Next, a specific example of $NCP_{SV}$, which is an example of the index calculated in step S23, will be described with reference to FIGS. 7 and 11. FIG. 11 illustrates an example of $NCP_{SV}$ of the set-valued attribute "drug name", which is calculated in step S23 when the division process described by using FIG. 7 is carried out for the data set illustrated in FIG. 6.

For example, as illustrated in the column "initial state" in FIG. 7, in the initial state, all attribute values of the set-valued attribute "drug name" in the respective records are in a state of being removed. In this case, the refinement attribute selection unit 35 calculates "$NCP_{SV}(r_i[\text{drug name}])=1$" for each record based on the formula (1). The column "initial state" in FIG. 11 illustrates $NCP_{SV}(r_i[\text{drug name}])$ of the respective records in the initial state. Then, the refinement attribute selection unit 35 calculates $NCP_{SV}(\text{drug name})$ in the "initial state" as "9", which is the total sum of $NCP_{SV}$'s of the respective records, based on the formula (2).

It is assumed that, as illustrated in FIG. 7, the refinement attribute selection unit 35 has selected the set-valued attribute "drug name" as a target of refinement. Then, the set-valued attribute refinement unit 22, as with the second exemplary embodiment, refines the set-valued attribute of the cluster in the initial state and divides the cluster. As a result of the operation, the anonymization state of the set-valued attribute "drug name" of the respective records changes to the state illustrated in "iteration 1" in FIG. 7.

For example, in the record on the first line in FIG. 7, the attribute value "a" of the set-valued attribute "drug name" is disclosed. On the other hand, the attribute values other than "a" remain removed. Thus, the refinement attribute selection unit 35 calculates "$NCP_{SV}(r_1[\text{drug name}])=2/3$" based on the formula (1). A symbol "/" denotes division.

In the same manner, the refinement attribute selection unit 35 also calculates $NCP_{SV}(r_i[\text{drug name}])$ for the records on the other lines based on the formula (1). The column "iteration 1" in FIG. 11 illustrates $NCP_{SV}(r_i[\text{drug name}])$ of the respective records in the state of "iteration 1" in FIG. 7. The refinement attribute selection unit 35 calculates $NCP_{SV}$ (drug name) in the state of "iteration 1" as "2/3+2/3+4/5+4/5+1+1+1+1+1 (=7+14/15≈7.9)" based on the formula (2).

Further, it is assumed that the refinement attribute selection unit 35, as illustrated in FIG. 7, has selected the set-valued attribute "drug name" as a target of refinement. Then, the set-valued attribute refinement unit 22, as with the second exemplary embodiment, refines and divides the respective clusters generated in the iteration 1. In consequence, the anonymization state of the set-valued attribute "drug name" of the respective records changes to the state of "iteration 2" illustrated in FIG. 7. The column "iteration 2" in FIG. 11 illustrates $NCP_{SV}(r_i[\text{drug name}])$ calculated based on the formula (1) for the records on the respective lines. Then, the refinement attribute selection unit 35 calculates $NCP_{SV}(\text{drug name})$ in the state as illustrated in "iteration 2" as "1/3+2/3+3/5+4/5+1+2/3+2/3+1+2/3 (=6.4)" based on the formula (2).

It is assumed that the refinement attribute selection unit 35, as illustrated in FIG. 7, has further selected the set-valued attribute "drug name" as a target of refinement. Then, the anonymization state of the set-valued attribute "drug name" of the respective records changes to the state illustrated in "iteration 3" in FIG. 7. $NCP_{SV}(r_i[\text{drug name}])$ in the state of "iteration 3" become one as illustrated in the column "iteration 3" in FIG. 11. The refinement attribute selection unit 35 calculates $NCP_{SV}(\text{drug name})$ in the state of "iteration 3" as "4+1/30≈4.0" based on the formula (2).

It is assumed that the refinement attribute selection unit 35, as illustrated in FIG. 7, has further selected the set-valued attribute "drug name" as a target of refinement. Then, the anonymization state of the set-valued attribute "drug name" of the respective records changes to the state as illustrated in "iteration 4" in FIG. 7. $NCP_{SV}(r_i[\text{drug name}])$ in the state of "iteration 4" becomes one as illustrated in the column "iteration 4" in FIG. 11. The refinement attribute selection unit 35 calculates $NCP_{SV}(\text{drug name})$ in the state of "iteration 4" as "2+2/3≈2.7" based on the formula (2).

As described above, for every refinement process of an attribute and division process of clusters, the refinement attribute selection unit 35 is able to select an attribute as a target of refinement based on an NCP value calculated for the refined attribute.

In the exemplary embodiment, the refinement attribute selection unit 35 calculates, as the NCP value of each attribute, the total sum of NCP values of the attribute in the respective records included in the anonymization target data set. However, the refinement attribute selection unit 35 does not have to abide by the above calculation method. For example, the refinement attribute selection unit 35 may calculate an NCP value of each attribute for each cluster. In this case, the refinement attribute selection unit 35 may calculate the total sum of NCP values of an attribute in the records included in a target cluster as the NCP value of the attribute in the cluster.

In the description of this exemplary embodiment, the set-valued attribute refinement unit 22 is described so that it carries out operations of refinement of the set-valued attribute and division of a cluster in the same manner as the second exemplary embodiment when an attribute selected as a target of refinement is a set-valued attribute. However, an operation of the set-valued attribute refinement unit 22 does not have to be limited to the operation. For example, when taxonomy is defined for a set-valued attribute selected as a target of refinement, the set-valued attribute refinement unit 22 may use an anonymization process with a general top-down approach for a set-valued attribute which is defined taxonomy. For example, the set-valued attribute refinement unit 22 may use a related technology described in NPL 3.

Next, an effect of the third exemplary embodiment of the present invention will be described.

The information processing device of the third exemplary embodiment is capable of achieving a unified anonymization process, in which anonymization processes for respective attributes are coexisted, for a data set which has a plurality of attributes in which set-valued attributes not provided taxonomy coexist.

A reason for the effect is as follows. First, the refinement attribute selection unit selects an attribute targeted in refinement among attributes that an anonymization target data set includes. When the selected attribute value is a set-valued attribute, the set-valued attribute refinement unit refines the set-valued attribute and divides a target cluster into clusters which satisfy a predetermined anonymity. When the selected attribute value is a single-valued attribute, the single-valued attribute refinement unit refines the single-valued attribute and divides the target cluster into clusters which satisfy the predetermined anonymity.

Furthermore, the refinement attribute selection unit selects an attribute targeted in refinement based on the anonymization state of the respective attributes after refinement. Then, based on whether the selected attribute value is a set-valued attribute or a single-valued attribute, the set-valued attribute refinement unit or the single-valued attribute refinement unit repeats refinement of the attribute and division of the cluster.

As described above, for a data set in which a plurality of attributes coexist, the exemplary embodiment employs an anonymization process of the first or second exemplary embodiment as an anonymization process for a set-valued attribute not provided taxonomy. Accordingly, the exemplary embodiment is capable of achieving a unified process in which anonymization processes for a single-valued attribute and a set-valued attribute coexist.

(Fourth Exemplary Embodiment)

Next, a fourth exemplary embodiment of the present invention will be described in detail with reference to the accompanying drawings.

The exemplary embodiment calculates, more efficiently, an index that is used in selecting an attribute targeted in refinement in the third exemplary embodiment. In respective drawings referenced in the description of the exemplary embodiment, identical signs are assigned to the same configuration and steps in which the same operations are carried out as the first to third exemplary embodiments, and detailed description thereof in the exemplary embodiment will be omitted.

Figure 12:
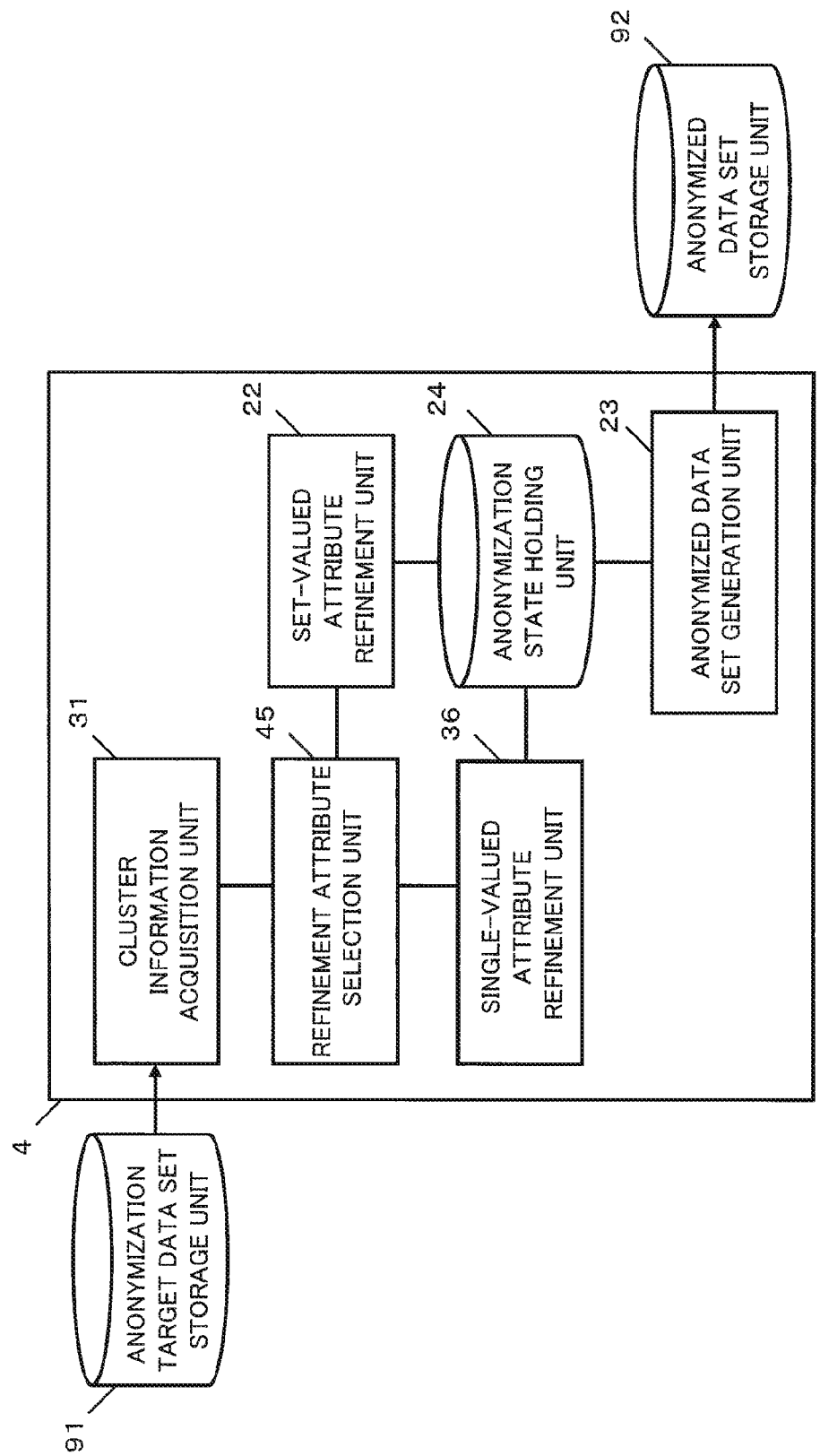
FIG. 12 is a block diagram illustrating an example of a configuration of an information processing device according to a fourth exemplary embodiment.

First, a block configuration of an example of a configuration of the information processing device 4 according to the fourth exemplary embodiment is illustrated in FIG. 12.

In FIG. 12, the information processing device 4 differs from the information processing device 3 of the third exemplary embodiment in a point in that the information processing device 4 includes a refinement attribute selection unit 45 in replacement of the refinement attribute selection unit 35. The information processing device 4 is configurable by using a computer device including the same hardware components as the information processing device 1 of the first exemplary embodiment, which was described with reference to FIG. 2. The hardware configuration which composes the information processing device 4 and respective functional blocks thereof is not limited to the configuration described above.

The refinement attribute selection unit 45, as with the refinement attribute selection unit 35 of the third exemplary embodiment, selects an attribute targeted in refinement based on an NCP value.

However, the refinement attribute selection unit 45 differs from the refinement attribute selection unit 35 of the third exemplary embodiment in the calculation method of the NCP value.

The refinement attribute selection unit 35 of the third exemplary embodiment, based on $NCP_{SV}$'s of a set-valued attribute in respective records, calculates $NCP_{SV}$ of the attribute. For example, when the formulae (1) and (2) are used, the refinement attribute selection unit 35 of the third exemplary embodiment requires the number of original attribute values for each record and the number of disclosed attribute values for a calculation of $NCP_{SV}$ of each attribute. Therefore, when the number of records is N, a calculation cost of O(N) is incurred for every calculation operation of an NCP value. Further, to store a calculation result, a space of O(N) is required. The symbol O is Landau's symbol (order symbol), which is used to express a calculation amount.

Furthermore, when there are c set-valued attributes, a space of O(cN) is required. Moreover, a record has a different attribute value for each record. Therefore, for every calculation operation, a search process to determine which attribute value is disclosed is required.

Thus, the refinement attribute selection unit 45 of the exemplary embodiment calculates an index indicating the degree of information loss of a set-valued attribute based on the mean value of the number of original attribute values included in the set-valued attribute per one record and the total number of disclosed attribute values in the set-valued attribute.

For example, the refinement attribute selection unit 45 calculates $NCP'_{SV}$ of the set-valued attribute based on the following formula (3).

$$NCP'_{SV}(\alpha) = N - M(\alpha)\frac{1}{y(\alpha)} \quad (3)$$

$M(\alpha)$ indicates the total number of attribute values that are disclosed for an attribute $\alpha$ in a target record group. For example, in the column "iteration 1" illustrated in FIG. 7, the total number M(drug name) of attribute values disclosed with respect to the attribute "drug name" is "4" since four attribute values a are disclosed.

$y(\alpha)$ indicates the mean value (mean number of items) of the number of attribute values of the attribute $\alpha$ per one record. For example, in the data set illustrated in FIG. 6, the mean number of items y(drug name) is "(3+3+5+5+3+3+3+2+3)/9≈3.3".

As has been already described, N is the number of records.

As described above, the refinement attribute selection unit 45 of the exemplary embodiment makes a value indicating how many attribute values are removed among attribute values included in the attribute $\alpha$ in the record group an index of the degree of information loss of the attribute $\alpha$. In the formula (3), all variables other than M(α) are constants. Therefore, the number of pieces of information that the refinement attribute selection unit 45 has to store is the number of set-valued attributes c. In other words, the refinement attribute selection unit 45 is able to store the information with a spatial cost of O(c). No value that is required to be searched with respect to each record for every calculation operation exists. In consequence, a search cost is significantly reduced.

Furthermore, when the formula (3) is used, the refinement attribute selection unit 45 should subtract 1/y(α), which is a constant term, every time an attribute value is disclosed, and can derive $NCP_{SV}$ of the set-valued attributes successively.

Operations of the information processing device 4, which is configured as described above, will be described with reference to FIG. 13.

Figure 13:
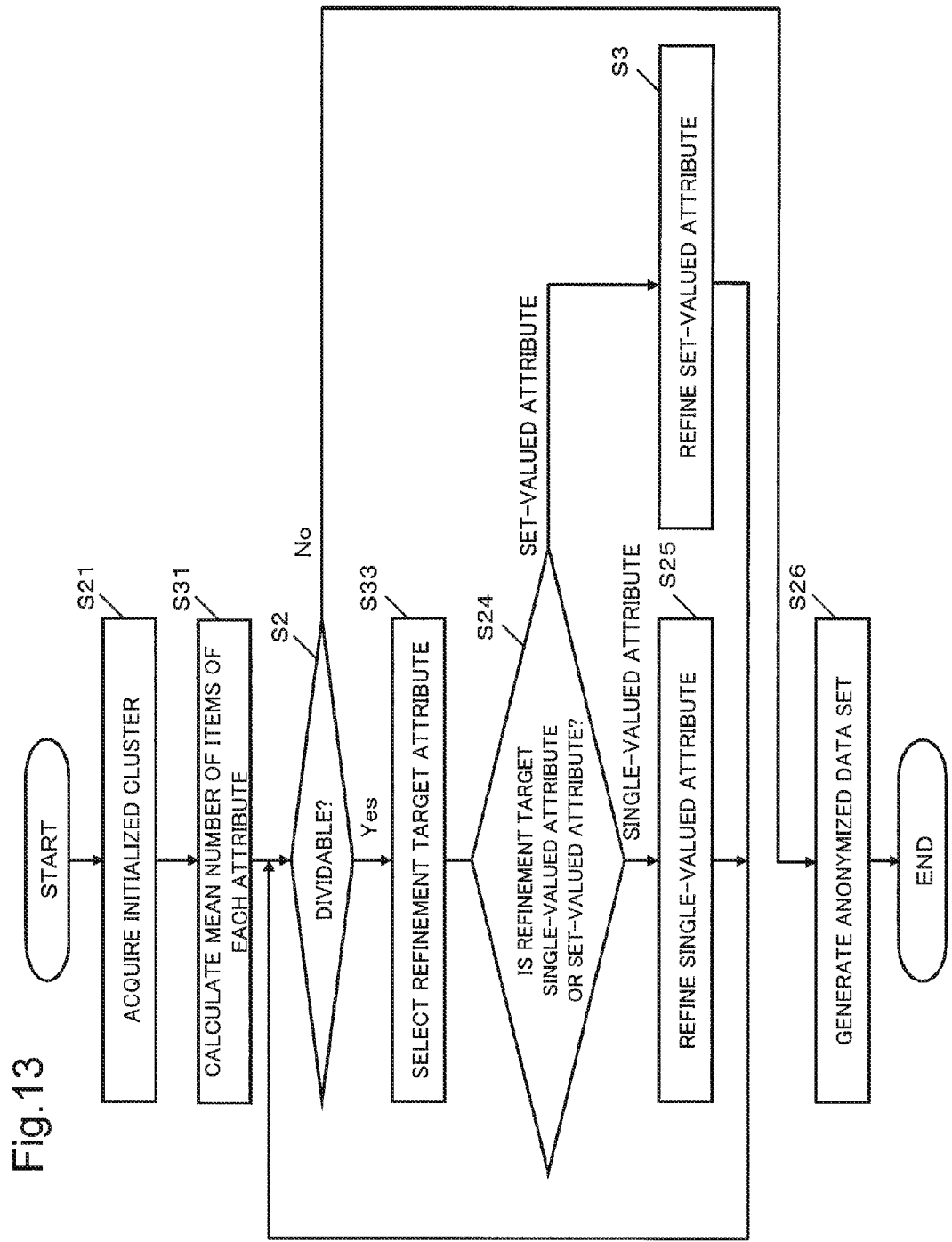
FIG. 13 is a flowchart describing an example of operations of the information processing device according to the fourth exemplary embodiment.
Figure 14:
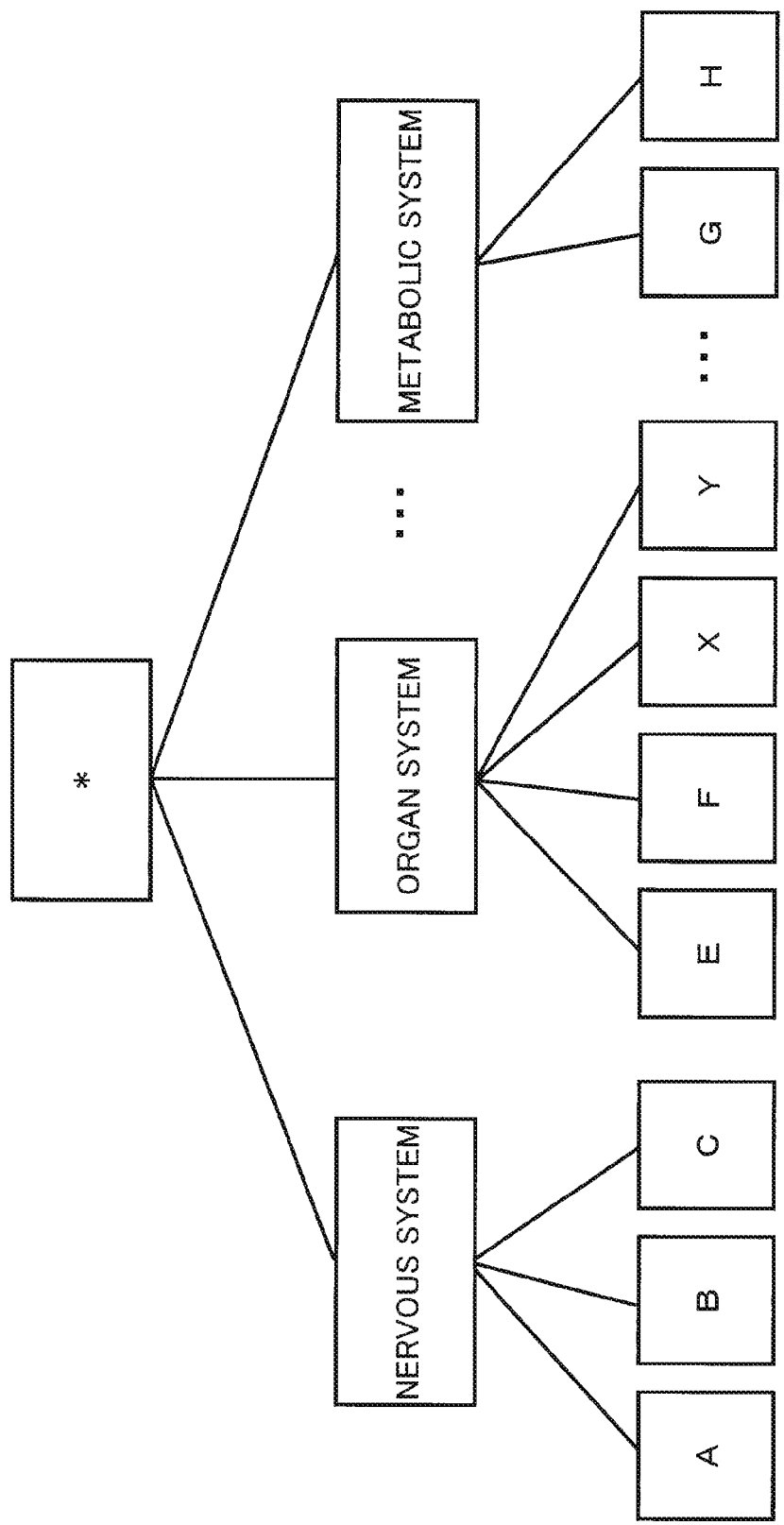
FIG. 14 is a diagram illustrating an example of taxonomy used in anonymization processes of related technologies.

In FIG. 13, the cluster information acquisition unit 31 first, as with the information processing device 3 of the third exemplary embodiment, acquires information indicating an initialized cluster (step S21).

Next, a refinement information selection unit 44 calculates a mean number of items for each set-valued attribute that a target data set has (step S31). Specifically, the refinement information selection unit 44 should calculate, as the mean number of items, the total number of attribute values taken by the set-valued attribute in the target record group/ the total number of records.

Next, the refinement attribute selection unit 45, as with the information processing device 3 of the third exemplary embodiment, determines whether or not the target cluster is dividable (step S2).

When the refinement attribute selection unit 45 determines that the target cluster is dividable, the refinement attribute selection unit 45 selects an attribute targeted in refinement (step S33). At this time, the refinement attribute selection unit 45 calculates $NCP_{SV}$, which is an index indicating the degree of information loss of a set-valued attribute, by applying the mean number of items of the set-valued attribute and the total number of disclosed attribute values of the set-valued attribute to the formula (3).

Thereafter, the information processing device 4 operates in the same manner as the third exemplary embodiment. That is, the information processing device 4 carries out attribute refinement and cluster division by using the set-valued attribute refinement unit 22 or the single-valued attribute refinement unit 36 based on whether the attribute value selected in step S33 is a set-valued attribute or a single-valued attribute (steps S24 to S25, and S3).

The information processing device 4 repeats steps S2, S33, S24 to S25, and S3 until undividable. When refinement of the attribute and division of clusters have converged (been completed), the anonymized data set generation unit 23, as with the third exemplary embodiment, generates an anonymized data set by referring to the anonymization state holding unit 24 (step S26).

At this point, the information processing device 4 ends the operation.

Next, an effect of the fourth exemplary embodiment of the present invention will be described.

The information processing device according to the fourth exemplary embodiment is capable of carrying out a unified process in which anonymization processes for the respective attributes coexist for a data set which has a plurality of attributes in which set-valued attributes not provided taxonomy coexist more speedily.

The reason for the effect is as follows. First, the refinement attribute selection unit calculates, in advance, the mean value of the number of original attribute values included in the respective set-valued attributes in the data set per one record. Then, the refinement attribute selection unit calculates an index indicating the degree of information loss of each set-valued attribute, based on the mean number of items of the set-valued attribute and the total number of disclosed attribute values of the set-valued attribute, when carrying out a step-by-step anonymization process. Based on the operation, the refinement attribute selection unit can speedily calculate the index indicating the degree of information loss of a set-valued attribute by comparing $NCP_{SV}$ of the set-valued attribute when calculating based on the total sum of $NCP_{SV}$'s of the respective records. As a result, the information processing device according to the exemplary embodiment can reduce a calculation cost and a spatial cost required for a selection process of an attribute targeted in refinement in respective steps of the anonymization process.

In the third and fourth exemplary embodiments, it is described that the refinement attribute selection unit selects an attribute targeted in refinement by using an NCP value. However, the refinement attribute selection unit of each exemplary embodiments may selects an attribute targeted in refinement based on an index or a combination of indices different from the NCP value.

In each exemplary embodiment described above, the information processing device or respective functional blocks may, for example, be configured with a dedicated device configured with integrated circuits.

Each exemplary embodiment described above may read out a program for a CPU to carry out operations of the information processing device described above from a storage medium storing the program in a computer-readable manner by using not-illustrated storage medium reading device, and execute the program. In this case, the present invention is configured with a code of the program or a storage medium.

The respective exemplary embodiments described above may be carried out in an appropriate combination thereof.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-002715, filed on Jan. 10, 2013, the disclosure of which is incorporated herein in its entirety by reference.

The whole or part of the exemplary embodiments disclosed above can be described as, but not limited to, the following supplementary notes.

(Supplementary Note 1)

An information processing device includes:

a cluster information acquisition unit which acquires information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and a set-valued attribute refinement unit which discloses at least a portion of attribute values from among removed attribute values of the set-valued attributes of records included in the cluster acquired by the cluster acquisition, and divides the cluster into clusters which satisfy the predetermined anonymity based on the disclosed attribute values.

(Supplementary Note 2)

The information processing device according to supplementary note 1, wherein the set-valued attribute refinement unit further discloses at least a portion of attribute values from among not disclosed attributes among the removed attribute values in records included in the clusters after division, and repeats a process of further dividing the cluster after division into clusters which satisfy the predetermined anonymity based on the disclosed attribute values.

(Supplementary Note 3)

The information processing device according to supplementary note 1 or 2, wherein the set-valued attribute refinement unit further discloses an attribute value capable to be disclosed while maintaining the predetermined anonymity of the cluster, when the cluster divided by the set-valued attribute refinement unit is not divided into clusters which satisfy the predetermined anonymity.

(Supplementary Note 4)

The information processing device according to any one of supplementary notes 1 to 3, wherein the record includes a single-valued attribute which includes a single values in addition to the set-valued attribute, wherein the information processing device further includes:

single-valued attribute refinement unit for dividing the cluster into clusters which satisfy the predetermined anonymity based on the single-valued attribute.

(Supplementary Note 5)

The information processing device according to any one of supplementary notes 1 to 4, wherein the set-valued attribute refinement unit selects an attribute value to be disclosed based on the number of attribute values to be disclosed.

(Supplementary Note 6)

The information processing device according to any one of supplementary notes 1 to 4, wherein the set-valued attribute refinement unit selects an attribute value to be disclosed based on a degree of priority of the attribute values.

(Supplementary Note 7)

The information processing device according to any one of supplementary notes 1 to 4, further includes:

a refinement attribute selection unit which selects an attribute to be a target of disclosure among attributes that the records include, wherein the set-valued attribute refinement unit discloses at least a portion of attributes among removed attribute values of the selected set-valued attribute, and divides the cluster based on the disclosed attribute value, when an attribute selected by the refinement attribute selection unit is the set-valued attribute.

(Supplementary Note 8)

The information processing device according to supplementary note 7, wherein the refinement attribute selection unit calculates an index indicating a degree of information loss of an attribute included in the record in an anonymized state, and selects the attribute targeted in refinement based on the calculated index.

(Supplementary Note 9)

The information processing device according to supplementary note 7, wherein the refinement attribute selection unit calculates an index with respect to each record for each set-valued attribute that a record group includes, and calculates an index related to the set-valued attribute in the record group based on the index of each record.

(Supplementary Note 10)

The information processing device according to supplementary note 7, wherein the refinement attribute selection unit calculates an index for the set-valued attribute in a record group based on a mean value of the number of original attribute values in the set-valued attribute per one record and the total number of disclosed attribute values of the set-valued attribute in the record group.

(Supplementary Note 11)

The information processing device according to any one of supplementary notes 1 to 10, further includes:

an anonymized data set generation unit which generates an anonymized data set in which a set of the records are anonymized in such a way as to satisfy the predetermined anonymity based on information indicating clusters divided by the set-valued attribute refinement unit.

(Supplementary Note 12)

An information processing method, includes:

acquiring information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and disclosing at least a portion of attribute values from among removed attribute values of the set-valued attributes of records included in the cluster acquired, and dividing the cluster into clusters which satisfy the predetermined anonymity based on the disclosed attribute values.

(Supplementary Note 13)

A computer-readable non-transitory recording medium embodying a program, the program causing an information processing device to perform a method, the method includes:

acquiring information indicating a cluster which is a set of records in an anonymized state in which at least a portion of attribute values of set-valued attributes, which can include one value or a plurality of values included in the records, is removed from the cluster which is a set of records including an attribute value so that the cluster satisfies a predetermined anonymity; and disclosing at least a portion of attribute values from among removed attribute values of the set-valued attributes of records included in the cluster acquired, and dividing the cluster into clusters which satisfy the predetermined anonymity based on the disclosed attribute values.

REFERENCE SIGNS LIST 1, 2, 3, 4 Information processing device
11, 21, 31 Cluster information acquisition unit
12, 22 Set-valued attribute refinement unit
23 Anonymized data set generation unit
24 Anonymization state holding unit
35, 45 Refinement attribute selection unit
36 Single-valued attribute refinement unit
91 Anonymization target data set storage unit
92 Anonymized data set storage unit
1001 CPU
1002 RAM

1003 ROM
1004 Storage device

Invention claimed is:

1. An information processing device comprising:
a processor; and
a storage, with a predetermined memory space, storing executable instructions that, when executed by the processor, causes the processor to perform as:
   a cluster information acquisition unit which acquires information indicating a cluster that includes a set of records in an anonymized state, wherein the anonymized state at least a portion of original attribute values of set-valued attributes are removed so that the cluster satisfies a predetermined anonymity, and each set-valued attribute is configured to include at least one value;
   a refinement attribute selection unit which selects each attribute to be a target of disclosure among attributes that the records include; and
   a set-valued attribute refinement unit configured to:
      restore at least a portion of the removed attributes of the selected set-valued attribute to the original attributes of the set-valued attribute, and
      divide the cluster, using a top-down approach, based on the disclosed attribute value, when the attribute selected by the refinement attribute selection unit is the set-valued attribute.

2. The information processing device according to claim 1, wherein
the refinement attribute selection unit calculates an index indicating a degree of information loss of an attribute included in the record in an anonymized state, and selects the attribute targeted in refinement based on the calculated index.

3. The information processing device according to claim 1, wherein
the refinement attribute selection unit calculates an index with respect to each record for each set-valued attribute that a record group includes, and calculates an index related to the set-valued attribute in the record group based on the index of each record.

4. The information processing device according to claim 1, wherein
the refinement attribute selection unit calculates an index for the set-valued attribute in a record group based on a mean value of the number of original attribute values in the set-valued attribute per one record and the total number of disclosed attribute values of the set-valued attribute in the record group.

5. An information processing method, comprising:
acquiring information indicating a cluster that includes a set of records in an anonymized state, wherein in the anonymized state at least a portion of original attribute values of set-valued attributes are removed so that the cluster satisfies a predetermined anonymity, and wherein each set-valued attribute is configured to include at least one value;
selecting each attribute to be a target of disclosure among attributes that the records include;
restoring at least a portion of the removed attributes of the selected set-valued attribute to the original attributes of the set-valued attribute; and
dividing the cluster, using a top-down approach, based on the disclosed attribute value, when the selected attribute is the set-valued attribute.

6. A computer-readable non-transitory recording medium storing a program implemented by at least one processor that allows a computer to perform the method of claim 5.

* * * * *